(12) United States Patent
Kotaba et al.

(10) Patent No.: US 11,764,907 B2
(45) Date of Patent: Sep. 19, 2023

(54) NON-ORTHOGONAL MULTIPLE ACCESS HYBRID AUTOMATIC REPEAT REQUEST

(71) Applicant: Apple Inc., Cupertino, CA (US)

(72) Inventors: Radoslaw Kotaba, Aalborg (DK); Nuno Manuel Kiilerich Pratas, Gistrup (DK); Tommaso Balercia, San Francisco, CA (US); Carles Navarro Manchon, Aalborg (DK); Petar Popovski, Aalborg (DE)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 17/283,641

(22) PCT Filed: Oct. 18, 2019

(86) PCT No.: PCT/US2019/057078
§ 371 (c)(1),
(2) Date: Apr. 8, 2021

(87) PCT Pub. No.: WO2020/082035
PCT Pub. Date: Apr. 23, 2020

(65) Prior Publication Data
US 2021/0399841 A1    Dec. 23, 2021

Related U.S. Application Data

(60) Provisional application No. 62/748,044, filed on Oct. 19, 2018.

(51) Int. Cl.
*H04L 1/18* (2023.01)
*H04L 1/00* (2006.01)
(Continued)

(52) U.S. Cl.
CPC .......... *H04L 1/1819* (2013.01); *H04L 1/0044* (2013.01); *H04L 1/1896* (2013.01); *H04L 1/203* (2013.01); *H04L 5/0005* (2013.01)

(58) Field of Classification Search
None
See application file for complete search history.

(56) References Cited

U.S. PATENT DOCUMENTS 6,167,031 A * 12/2000 Olofsson ............... H04W 52/24
370/252
6,320,898 B1 * 11/2001 Newson ............... H04B 7/0632
455/562.1
(Continued)

FOREIGN PATENT DOCUMENTS

KR    10-2905-0007980 A    1/2005

OTHER PUBLICATIONS

PCT Search Report dated Mar. 3, 2020 in connection with PCT Application No. PCT/US2019/057078.
(Continued)

*Primary Examiner* — Steve R Young
(74) *Attorney, Agent, or Firm* — Eschweiler & Potashnik, LLC

(57) ABSTRACT

A device of a receiver, a method and a machine readable medium to implement the method. The method includes: determining a residual rate to identify a decoding estimate for a first packet sent from a wireless first transmitter; determining a grouping of transmitters including the first transmitter and a wireless second transmitter scheduled to transmit a second packet; performing power optimization by determining lowest necessary transmission powers corresponding, respectively, to transmissions of the first packet from the first transmitter and of the second packet from the second transmitter, wherein the transmissions of the first and second packets are within a same time-frequency resource and together define a signal to be received at the receiver; and encoding for transmission to the first and second trans-
(Continued)

mitters information on the signal based on the residual rate, the grouping and the power optimization.

21 Claims, 11 Drawing Sheets

(51) Int. Cl.
    *H04L 1/20*     (2006.01)
    *H04L 5/00*     (2006.01)
    *H04L 1/1812*     (2023.01)
    *H04L 1/1867*     (2023.01)

(56) References Cited

U.S. PATENT DOCUMENTS

| | | | | |
|---|---|---|---|---|
| 2003/0084384 A1* | 5/2003 | White, III | ......... | H04L 12/40032 |
| | | | | 714/704 |
| 2004/0137896 A1* | 7/2004 | Sarkar | ................. | H04J 13/0048 |
| | | | | 455/423 |
| 2005/0226182 A1* | 10/2005 | Itoh | ....................... | H04W 52/48 |
| | | | | 370/332 |
| 2006/0068825 A1* | 3/2006 | Iochi | ................... | H04W 52/228 |
| | | | | 455/67.11 |
| 2008/0075033 A1* | 3/2008 | Shattil | ................. | H04L 27/2636 |
| | | | | 370/328 |
| 2013/0019137 A1 | 1/2013 | Wu et al. | | |
| 2016/0174230 A1 | 6/2016 | Benjebbour et al. | | |
| 2016/0205631 A1* | 7/2016 | Chen | ................... | H04W 52/346 |
| | | | | 455/522 |
| 2016/0277156 A1 | 9/2016 | Bayesteh et al. | | |
| 2017/0237480 A1* | 8/2017 | Xu | ....................... | H04B 7/0814 |
| | | | | 370/329 |
| 2018/0070265 A1 | 3/2018 | Seo et al. | | |
| 2019/0280532 A1* | 9/2019 | Matsuo | ................... | H02J 50/20 |
| 2020/0022097 A1* | 1/2020 | Wang | ................. | H04W 52/146 |

OTHER PUBLICATIONS

PCT Written Opinion dated Mar. 3, 2020 in connection with PCT Application No. PCT/US2019/057078.

3rd Generation Partnership Project; Technical Specification Group Radio Access Network; NR; Physical layer; General description; (Release 15); 3GPP TS 38.201 V15.0.0; Dec. 2017.

3rd Generation Partnership Project; Technical Specification Group Radio Access Network; NR; NR and NG-RAN Overall Description; Stage 2 (Release 15); 3GPP TS 38.300 V15.3.1; Oct. 2018.

* cited by examiner

NON-ORTHOGONAL MULTIPLE ACCESS HYBRID AUTOMATIC REPEAT REQUEST

CROSS REFERENCE TO RELATED APPLICATIONS

This application is a National Phase entry application of International Patent Application No. PCT/US2019/057078 filed Oct. 18, 2019, which claims the benefit of and priority from U.S. Provisional Patent Application No. 62/748,044 entitled "NON-ORTHOGONAL MULTIPLE ACCESS HYBRID AUTOMATIC REPEAT REQUEST," filed Oct. 19, 2018, the entire disclosures of which is incorporated herein by reference.

FIELD

Various embodiments generally relate to the field of cellular communications, and particularly to Hybrid Automatic Repeat Request (HARQ) feedback.

BACKGROUND

Current Third Generation Partnership Project (3GPP) New Radio (NR) specifications (or 5G specifications) do not specifically address issues related to spectral efficiency in the context of HARQ feedback, especially for low latency applications.

DETAILED DESCRIPTION

Figure 1:
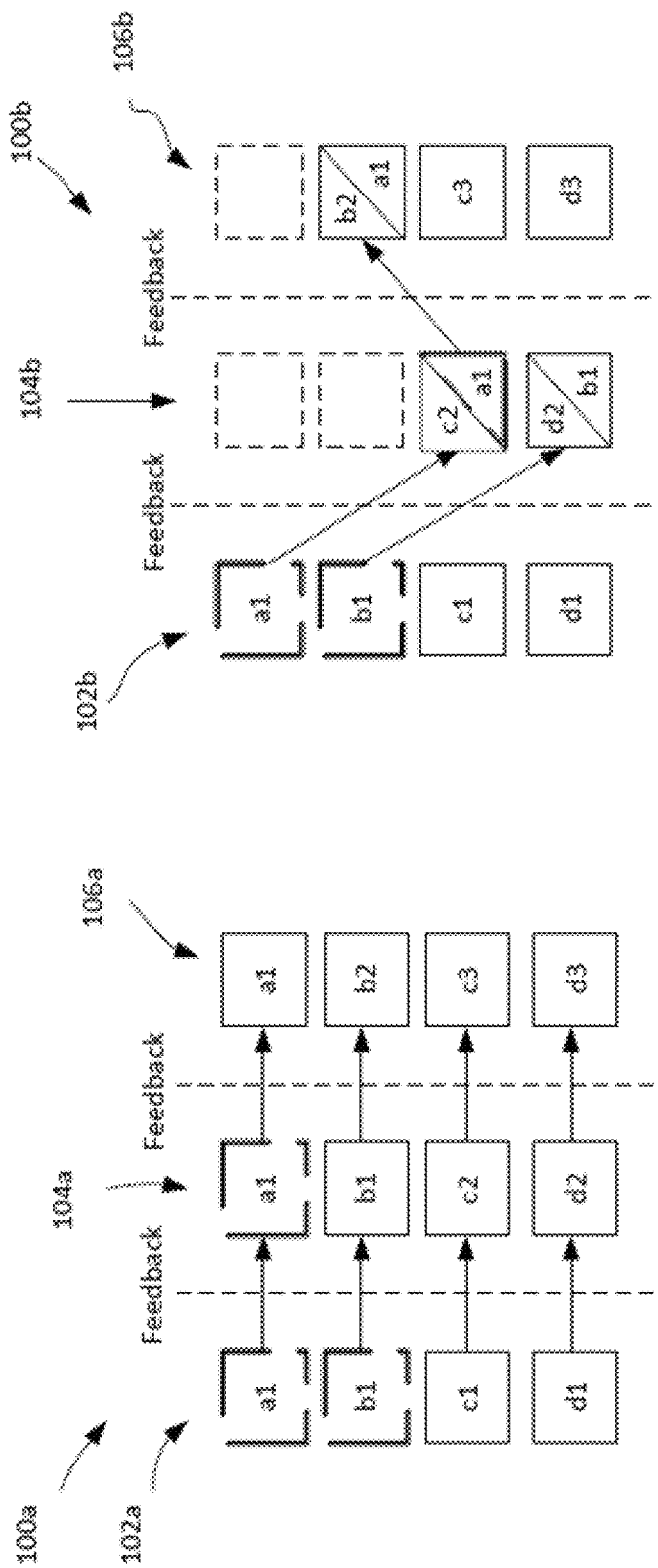
FIG. 1 illustrates a signaling diagram for HARQ feedback in a legacy scenario (a) and NOMA-HARQ (b) according to one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments are directed to novel techniques to improve the spectral efficiency of retransmissions in cellular wireless systems with tight latency and reliability requirements.

With the upcoming 5G specification, there are new, exciting features such as URLLC. While, traditionally, reliability has been achieved by packet retransmissions, retransmission mechanisms are significantly impacted by simultaneous latency requirements. When the amount of bandwidth resources is limited, URLLC packets cannot afford to wait in the queue as they are to be sent immediately. Embodiments address this problem by introducing the concept of non-orthogonal multiple access hybrid automatic repeat request (NOMA-HARQ). The techniques described herein allow the scheduling of new incoming packets with the ones requiring retransmission jointly, on the same physical resources, while providing a desired level of reliability to each of the packets being transmitted. The latter may be achieved through a power optimization procedure described herein that takes into account both past transmission attempts as well as the time left until the retransmission deadline.

Retransmission mechanisms such as HARQ are universally used in wireless communications to cope with packet errors and provide a certain level of reliability. Because contemporary receivers reuse the faulty packets rather than discarding them, with each consecutive retransmission the probability of decoding the message becomes higher. This might lead to a situation where the packet is already close to being decoded and another transmission of the full packet on dedicated resources would be a waste. The straightforward idea to send a shorter packet containing just enough redundancy bits, while intuitive, is not easy to accomplish in practice as it would require additional signaling and changes to the entire protocol to allow for dynamically changing packet sizes.

Meeting the target error rates which would enable effective communication between devices using a single, so called one-shot transmission (legacy transmission), would require high transmission power. Instead, the uncertainties introduced by noise and channel fluctuations are overcome by the time and frequency diversity that the repetitions provide. However, from the point of view of channel resources, a retransmission is just another packet that needs to be scheduled while not contributing to the goodput (which may represent a number of useful information bits delivered by a network to a certain destination per unit of time). Because the share of retransmissions in the overall traffic in the wireless medium might be significant, there is an opportunity to improve spectral efficiency by developing more advanced retransmission schemes.

Embodiments address the limitations of the traditional HARQ mechanism, which allocates precious physical resources to each retransmission attempt. Embodiments described herein are directed to a novel technique based on non-orthogonal multiple access (NOMA) and special power optimization procedure that improves spectral efficiency while meeting application specific latency and reliability targets. Embodiments include two examples that are characterized by different user requirements (Ultra Reliable Low Latency Communication (URLLC) and Device to Device (D2D) communication, respectively), and show that techniques described herein are versatile enough to accommodate a wide range of use cases and still offer significant gains for each of them.

In order to present the advantages of the embodiments described herein, they may be compared with the traditional approach in which all devices use dedicated resources. As a result, these techniques may achieve the same reliability targets with lower amount of resources while not increasing drastically the average power used by the users.

The simplest retransmission techniques used in legacy systems involve resending packets on dedicated physical resources that are equal in terms of time and frequency use to those used for the original packet (HARQ type II and III).

More efficient techniques such as described herein for NR involves partitioning the original message into code blocks, and sending an acknowledgment/negative-acknowledgment (ACK/NACK) feedback for each of the code blocks separately. This is a special case of a broader family of adaptive HARQ techniques which can be considered as legacy techniques. These legacy techniques utilize either dynamic rate adaptation, or dynamically vary the length of the transmitted redundancy portion.

Other techniques based on a completely different paradigm also exist, such as the multi-user automatic repeat query/automatic repeat request (ARQ) using network coding. Such techniques, however, are mainly suitable for broadcast scenarios where a single node communicates with multiple receivers. Embodiments are useful in the case of multiple transmitters and a single receiver.

The simplest legacy techniques, while straightforward, can be spectrally inefficient, as they do not adapt their retransmission strategy based on the previous transmissions and partial mutual information available at the receiver. The so called code-block group (CBG) legacy-based techniques approved for 5G are suitable only for larger packets, and do not offer any improvement in settings tailored to URLLC or D2D.

More elaborate adaptive legacy techniques, while demonstrating very good performance, can be difficult to implement in practice as they require either packets of variable sizes (entailing additional signaling and changes to the entire protocol) or changing the modulation and coding scheme (MCS) between retransmissions (making it difficult to efficiently combine different packets).

Embodiments described herein are directed to a receiver intentionally scheduling retransmissions together with the regular traffic in order to save channel resources. This may be applicable in a cellular uplink setting as well as in D2D setting, where in both cases the receiver may take the scheduling role. The result may include a NOMA-like scheme, where the reliable communication is ensured by a special power optimization procedure that allows a tuning of the power for co-scheduled devices.

The techniques described herein may allow for saving channel resources while not compromising the overall communication link reliability. The obtained savings directly translate to a higher spectral efficiency and in some applications even reduce the system-level latency.

Legacy retransmission mechanisms such as HARQ, are universally used in wireless communications to cope with packet errors and provide a certain level of reliability. Because current receivers reuse the faulty packets rather than discarding them, the amount of missing mutual information required to decode the message becomes smaller with each consecutive retransmission. This might lead to a situation where the packet is already close to being decoded and another transmission of the full packet on dedicated resources would be a waste. The straightforward idea to send a shorter packet containing just enough parity bits, while intuitive, is not easy to accomplish in practice as it would require additional signaling and changes to the entire protocol. Instead, embodiments disclosed herein provide a scheme where potential retransmissions are scheduled on the same resources as new incoming traffic, leading to a NOMA-like HARQ mechanism. Because a new packet will require higher power than the one which is already partially received, this creates a natural difference in power levels that is the underlying principle of operation of NOMA.

Non-Limiting Example

Consider a generic type of communication in which several users transmit their data to a common receiving node. It is assumed that the receiver and the transmitters are synchronized and the initial link establishment procedure has been successfully performed. It is further assumed that users transmit their packets using blocks composed of fixed numbers of resource elements referred to as slots.

Figure 10:
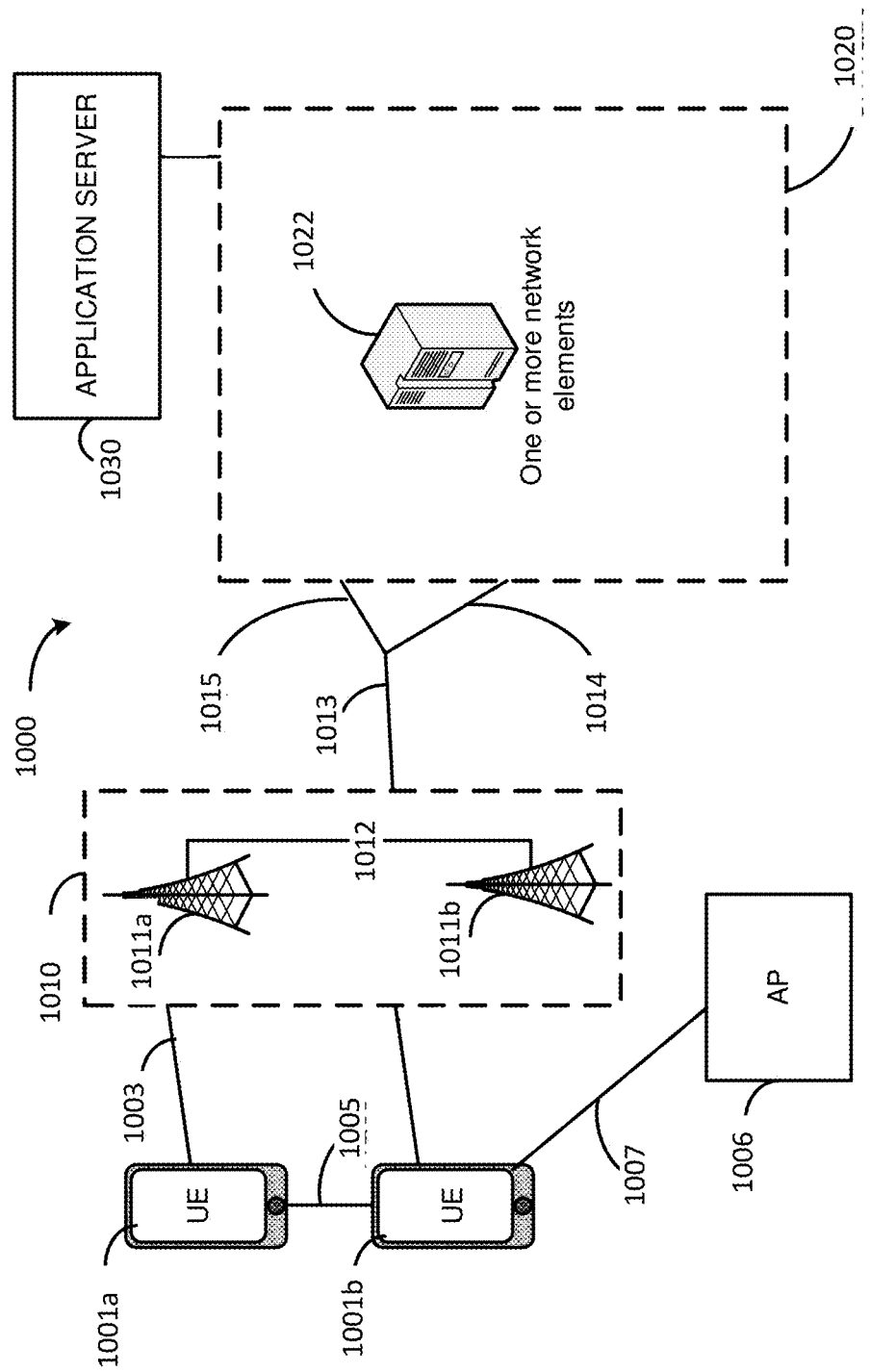
FIG. 10 illustrates an example architecture of a system of a network, in accordance with various embodiments.

In the example, the receiver (e.g. base station) schedules new transmissions to the transmitters (e.g. UEs a, b, c, d which may be similar to UEs $1001a$ and $1001b$ of FIG. 10) on dedicated slots.

Consider a single cell serving N URLLC-type users transmitting in the uplink and up to N orthogonal subcarriers used in an orthogonal frequency division multiplexing (OFDM) fashion. Both UEs and the base station receiver are equipped with a single antenna. We assume that each UE transmits the packets of the same fixed size equal to K channel uses (constituting a unit we will refer to as a slot) and uses the same transmission rate R. The channel between the UE and base station is assumed to be constant for the duration of the slot but may change independently between different transmissions attempts (by virtue of Rayleigh block fading). In our model we consider a fully coordinated type of communication, that is, one where each data transmission in the uplink is preceded by a scheduling from the base station that informs a UE about the allocated subcarrier/channel and the power that should be used for the transmission. In order to account for the latency constraints, we assume that each packet can be retransmitted at most L times, with L being a system parameter depending on the specific use case and the specific latency budget for that use case.

Reference is now made to FIG. 1, which shows a signaling diagram for HARQ feedback in a legacy scenario $100a$, and according to one embodiment of NOMA-HARQ in scenario $100b$, where four different UEs are sending uplink messages to a base station. FIG. 1. provides a comparison of the legacy retransmission mechanism of $100a$ and embodiments of the NOMA-HARQ according to $100b$. In the example, there are N=4 transmitters a, . . . , d. The maximum number of HARQ rounds is L=2. The boxes with broken borders around each transmission from a, . . . , d denote a decoding failure, while boxes with solid borders around each transmission from a, . . . , denote a decoding success at the receiver. In the traditional approach of 100a, UE a, which happens to require 2 retransmissions, would occupy in total of 3 slots to transmit packet a1. Using NOMA-HARQ in 100b, UE a transmits replicas together with packet $c_2$ first and then with packet $b_2$. The resources saved this way can be used to for example admit more users or be opportunistically assigned to other types of traffic such as eMBB traffic.

In FIG. 1, for both scenarios 100a and 100b, in the initial round 102a and 102b, some of the UE messages are successful (c1, d1) and will be followed by new ones (c2, d2) in a second round 104a and 104b as shown. However, some of the messages are not successful (a1, b1) as shown in broken squares (100a, 100b) or broken triangles (100b) in FIG. 1, and will require a retransmission of the same packet in rounds 104a/104b or 106a/106b. The allocation for the subsequent round is signaled to the users through a feedback sent by the base station, marked "Feedback" in FIG. 1. In legacy HARQ as shown in scenario 100a, all of the transmissions will happen on dedicated resources. In the NOMA-HARQ approach according to one embodiment as shown in scenario 100b, the failed packets a1 and b1 from UE a and b are scheduled together with the new packets originating from UE c and d. Transmissions are performed with appropriate power levels that allow the base station to differentiate between the various messages sent by each UE by virtue of the power domain and in this way provide required reliability. The increased decoding difficulty of this scheme compared to the legacy HARQ can be compensated by utilizing advanced successive interference cancellation (SIC) processing and the partial information contained in previous unsuccessful messages. Continuing the example in FIG. 1, we can see that both schemes eventually manage to deliver the same number of packets (a1, b1, b2, c1, c2, c3, d1, d2, d3) but the amount of resources necessary in NOMA-HARQ is only as many as the number of new messages $$\left(\text{and hence the rate } R \to 1\frac{\text{packet}}{\text{slot}}\right)$$

while the effective rate of legacy HARQ is reduced by the amount equal to the average error rate.

In order to save resources and take advantage of the generally low probability of packet failures (characteristic to URLLC scenarios) users might be instructed to share the slots following a NOMA principle. Let $\mathcal{I}^i$ denote the set of indices of the UEs that are scheduled to transmit using the slot on subcarrier i. Furthermore, let the cardinality of that set be equal to M. For a given i, the channel output corresponding to a single symbol can be written as:

$$y_i = \sum_{j \in \mathcal{I}^i} \sqrt{P_{i,j}}\, h_{i,j} x_{i,j} + n_i \qquad \text{Eq. (1)}$$

where $y^i \in \mathbb{C}$ is a complex received signal, $P_{i,j} \in \mathbb{R}$ is a transmit power of user] in slot i, $h_{i,j} \in \mathbb{C}$ is the channel gain, $x_{i,j} \in \mathbb{C}$ is a complex transmitted symbol and $n_i \in \mathbb{C}$ is a complex additive white Gaussian noise with zero mean and variance σ2.

The channel coefficients represent uncorrelated Rayleigh flat fading channel, i.e. their realizations are independent and identically distributed (i.i.d) zero mean circularly symmetric complex gaussian (ZMCSCG) variables with unit variance.

Throughout the instant disclosure, we assume that the distribution of the channel coefficients is known to the receiver and it is capable of perfect channel estimation, but no channel state information at the transmitter (CSIT) and no apriori channel state information at the receiver (CSIR) is available. Furthermore, in the instant disclosure, users are not allowed to transmit on several subcarriers simultaneously. Because of the latter, we will omit the index i in the below description wherever the omission does not create ambiguity and a single slot is being discussed.

One of the true enablers of NOMA is the possibility of performing successive interference cancellation (SIC) by the receiver, and iteratively decoding signals of distinct UEs. Given the model in Equation (1) above, and an arbitrary order of decoding (1, 2, ..., M), the maximum instantaneous rate of user j is given by:

$$R_j = \log_2\left(\frac{P_j |h_j|^2}{\sum_{k=j+1}^{M} P_k |h_k|^2 + \sigma^2}\right) \qquad \text{Eq. (2)}$$

and the corresponding packet can be decoded when:

$$R_j \geq R \qquad \text{Eq. (3)}$$

Equation (2) holds true if the packets of users 1, 2, ..., j−1 were successfully decoded first.

Figure 2:
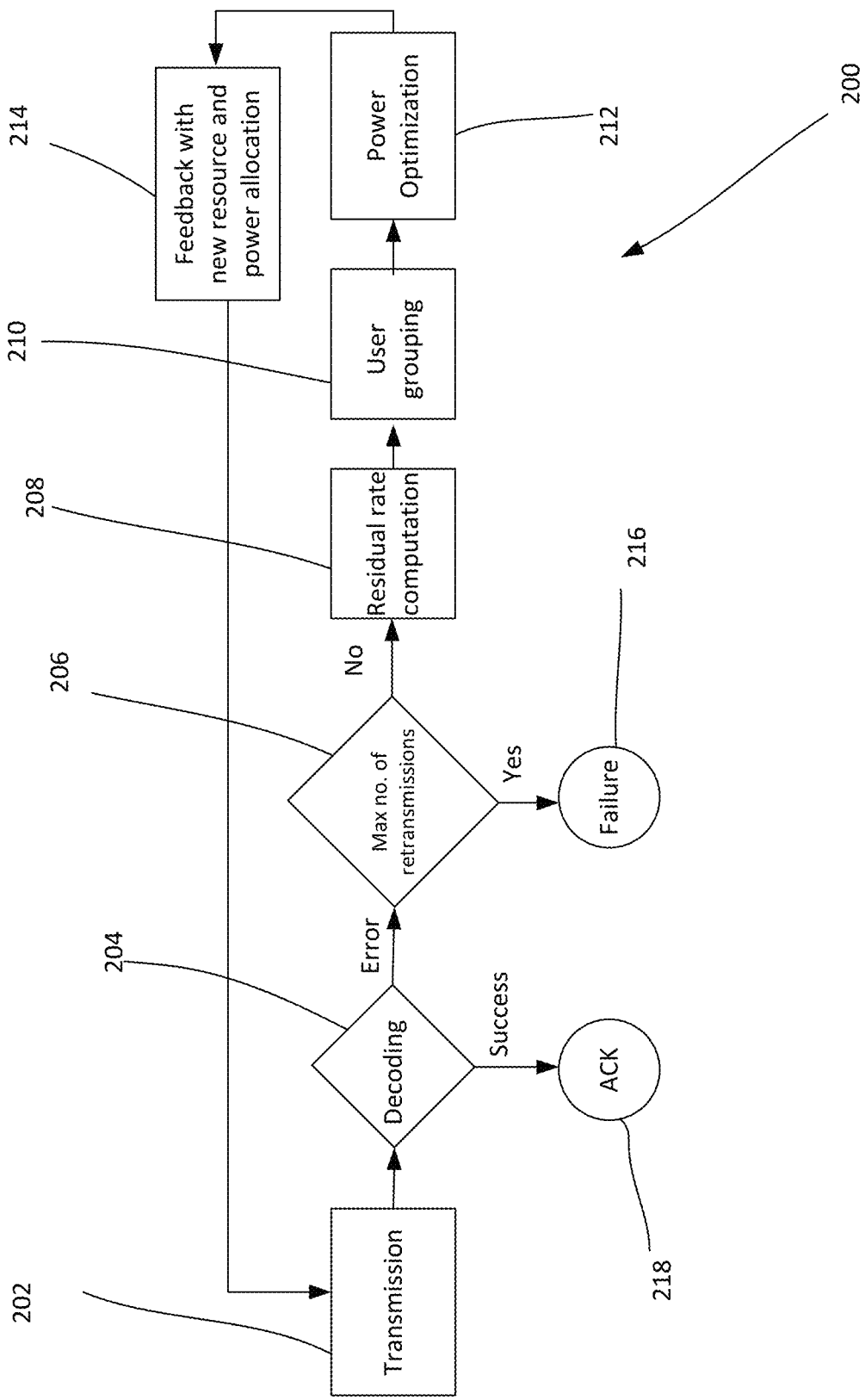
FIG. 2 illustrates an example of a NOMA-HARQ algorithm according to embodiments.

One embodiment of the high-level description of the NOMA HARQ algorithm is presented in FIG. 2 in a form of a flow diagram 200. As seen in FIG. 2, once a packet is transmitted at 202 by a given UE, a decoding attempt is performed by the receiving base station, such as a NR evolved NodeB or gNodeB, at 204. If the packet is received successfully, the gNodeB then sends an ACK to the UE at 218. However, if the packet is not received successfully at the gNodeB, then gNodeB proceeds to check if the maximum allowed number of retransmissions L has already been achieved for that packet at 206. If the maximum number of retransmissions have been made, gNodeB sends a NACK to the UE to declare a packet failure caused by violation of latency constraint at 216.

However, if further retransmissions are possible, the gNodeB performs a residual rate computation at 208, in this way providing an estimate of how far the given packet is from being decoded by the gNodeB in terms of mutual information. Calculation of the residual rate may be based on the effective signal to noise ratios (SNRs) in previous trials for transmission of the packet. Thereafter, at 210, the gNodeB makes a determination regarding user grouping, in this way pairing one or more users requiring retransmission with one or more users that are due to transmit new packets in the next frame. Then, at 212, the gNodeB performs a power optimization determination by determining a lowest necessary transmission power to achieve target error rates. Depending on whether the slot will be dedicated to a single device or shared by a transmission and retransmission, the procedure to optimize the power may be different according to some embodiments. At 214, the gNodeB provides feedback to the UEs with respect to new resources and power allocations.

A difference between embodiments as compared to the legacy implementation, is the introduction of the three additional sub-blocks:

Residual rate computation for example at 208 in FIG. 2;
User grouping for example at 210 in FIG. 2; and
Power optimization for example at 212 in FIG. 2.

A goal of embodiments is to enable a sharing of time frequency resources such that the high reliability is ensured (e.g. at $10^{-5}$) while minimizing the average power spent by each user. To that end, embodiments provide a NOMA-HARQ approach where each user requiring retransmission will be bundled together with a user transmitting a new packet. Consequently, at each round, only as many slots are used as the number of new packets. An example of operation of such retransmission mechanism is shown for example in FIG. 1 at scenario 100*b*. In the below equations of the instant disclosure, we will assume a case where a slot may be shared by at most two devices. A procedure to optimize the transmit power is explained next.

Power Optimization Details

One important aspect of some embodiments involves the power optimization procedure as described in the context of the example of FIG. 2 above, which ensures that the scheme meets target error rates within a specified deadline, while allowing the transmitting UE to be power efficient.

The probability that the packet of $j^{th}$ user after l retransmissions cannot be decoded (assuming Chase Combining (CC) transmission mode) is given by Equation (4) below:

$$P_{er_j}^{(l)} = Pr\{log_2(1+\Sigma_{i=0}^{l}SINR_j^{(i)})<R\} \quad \text{Eq. (4)}$$

where R is the rate at which transmission was made and $SINR_j^{(i)}$ is the effective/(post-processing) signal to interference plus noise ratio (SINR) of the $i^{th}$ packet replica sent by user j. Equation (4) can be further transformed as:

$$P_{er_j}^{(l)} = Pr\{SINR_j^{(l)} < 2^R - 1 - \Sigma_{i=0}^{l-1}SINR_j^{(i)} = \gamma_j^{(l)}\} \quad \text{Eq. (5)}$$

where the term $\gamma_j^{(l)}$ is a residual SINR at round l, which corresponds to the amount of signal power missing until successful decoding. The receiver may expect the packet at round l to be decoded with probability no less than a certain target error rate $\epsilon^{(l)}$, i.e.:

$$Pr\{SINR_j^{(l)} < \gamma_j^{(l)}\} \le \epsilon^{(l)} \quad \text{Eq. (6)}$$

If the user is going to be scheduled in that resource alone, then (6) becomes:

$$Pr\left\{\frac{P_j^{(l)}|h_j^{(l)}|^2}{\sigma^2} < \gamma_j^{(l)}\right\} \le \epsilon^{(l)} \Leftrightarrow 1 - e^{\frac{\gamma_j^{(l)}\sigma^2}{P_j^{(l)}}} \le \epsilon^{(l)} \quad \text{Eq. (7)}$$

where the equivalency is due to the assumption of the uncorrelated Rayleigh fading channel whose power (squared magnitude of the gain) is exponentially distributed. Moreover, the term $\gamma_j^{(l)}$ is a constant because it depends only on the SINRs from previous rounds which are known to the receiver. The optimal transmit power that follows from Equation (7) is:

$$P_j^{(l)} = -\frac{\gamma_j^{(l)}\sigma^2}{\ln(1-\epsilon^{(l)})} \quad \text{Eq. (8)}$$

Embodiments as described using the equations above may be easily modified to work with the Incremental Redundancy Type HARQ. What would change in such a case is the way in which the SINR is computed. In that case, Equation (4) becomes:

$$P_{er_j}^{(l)} = Pr\left\{\sum_{i=0}^{l}\log_2(1+SINR_j^{(i)}) < R\right\} \quad \text{Eq. (9)}$$

and consequently Equation (5) becomes:

$$P_{er_j}^{(l)} = Pr\left\{SINR_j^{(l)} < \frac{2^R}{\prod_{i=0}^{l-1}1+SINR_j^{(i)}} - 1 = \gamma_{IR_j}^{(l)}\right\} \quad \text{Eq. (10)}$$

In the event that the receiver, such as the gNodeB, decides to schedule two users in the same slot, the derivation may also need to take into account the impact of successive interference cancellation. Assuming user j is currently at its lth attempt and user k at mth attempt and the decoding order is fixed, the probability that the packet of $j^{th}$ user after l retransmissions cannot be decoded may be written as:

$$P_{er_j}^{(l)} = Pr\left\{\frac{P_j^{(l)}|h_j^{(l)}|^2}{P_k^{(m)}|h_k^{(m)}|^2 + \sigma^2} < \gamma_j^{(l)}\right\} \quad \text{Eq. (11)}$$

and the probability that the packet of kth user after m retransmissions cannot be decoded may be written as:

$$P_{er_k}^{(m)} = Pr\left\{\frac{P_k^{(m)}|h_k^{(m)}|^2}{\sigma^2} < \gamma_k^{(m)}, \frac{P_j^{(l)}|h_j^{(l)}|^2}{P_k^{(m)}|h_k^{(m)}|^2 + \sigma^2} > \gamma_j^{(l)}\right\} + \quad \text{Eq. (12)}$$

$$Pr\left\{\frac{P_k^{(m)}|h_k^{(m)}|^2}{P_j^{(l)}|h_j^{(l)}|^2 + \sigma^2} < \gamma_k^{(m)}, \frac{P_j^{(l)}|h_j^{(l)}|^2}{P_k^{(m)}|h_k^{(m)}|^2 + \sigma^2} < \gamma_j^{(l)}\right\}$$

In the embodiment in which optimal SIC ordering is used rather than fixed ordering, the packet error probabilities for user j and k are given instead as:

$$P_{er_j}^{(l)} = Pr\left\{\frac{P_j^{(l)}|h_j^{(l)}|^2}{\sigma^2} < \gamma_j^{(l)}, \frac{P_k^{(m)}|h_k^{(m)}|^2}{P_j^{(l)}|h_j^{(l)}|^2 + \sigma^2} > \gamma_k^{(m)}\right\} + \quad \text{Eq. (13)}$$

$$Pr\left\{\frac{P_j^{(l)}|h_j^{(l)}|^2}{P_k^{(m)}|h_k^{(m)}|^2 + \sigma^2} < \gamma_j^{(l)}, \frac{P_k^{(m)}|h_k^{(m)}|^2}{P_j^{(l)}|h_j^{(l)}|^2 + \sigma^2} < \gamma_k^{(m)}\right\}$$

$$P_{er_k}^{(m)} = Pr\left\{\frac{P_k^{(m)}|h_k^{(m)}|^2}{\sigma^2} < \gamma_k^{(m)}, \frac{P_j^{(l)}|h_j^{(l)}|^2}{P_k^{(m)}|h_k^{(m)}|^2 + \sigma^2} > \gamma_j^{(l)}\right\} + \quad \text{Eq. (14)}$$

$$Pr\left\{\frac{P_k^{(m)}|h_k^{(m)}|^2}{P_j^{(l)}|h_j^{(l)}|^2 + \sigma^2} < \gamma_k^{(m)}, \frac{P_j^{(l)}|h_j^{(l)}|^2}{P_k^{(m)}|h_k^{(m)}|^2 + \sigma^2} < \gamma_j^{(l)}\right\}$$

Equations (13) and (14) correspond to the SIC with optimal ordering, and may be obtained in closed form, as given by Equation (15) below:

$$P_{er_j}^{(l)} = \begin{cases} 1 - \left( \frac{P_j^{(l)}}{P_k^{(m)}\gamma_j^{(l)}+P_j^{(l)}} + \frac{P_k^{(m)}}{P_j^{(l)}\gamma_k^{(m)}+P_k^{(m)}} e^{-\sigma^2 \frac{\gamma_j^{(l)}\gamma_k^{(m)}+\gamma_k^{(m)}}{P_k^{(m)}}} \right) e^{-\frac{\gamma_j^{(l)}\sigma^2}{P_j^{(l)}}}, & \text{if } \gamma_j^{(l)}\gamma_k^{(m)} \geq 1 \\ \\ A - \left( \frac{P_k^{(m)}\gamma_j^{(l)}}{P_k^{(m)}\gamma_j^{(l)}+P_j^{(l)}} - \frac{P_k^{(m)}}{P_j^{(l)}\gamma_k^{(m)}+P_k^{(m)}} \right) e^{-\frac{\sigma^2}{1-\gamma_j^{(l)}\gamma_k^{(m)}} \left( \frac{\gamma_j^{(l)}\gamma_k^{(m)}+\gamma_k^{(m)}}{P_k^{(m)}} + \frac{\gamma_j^{(l)}\gamma_k^{(m)}+\gamma_j^{(l)}}{P_j^{(l)}} \right)}, & \text{if } \gamma_j^{(l)}\gamma_k^{(m)} < 1 \end{cases} \quad \text{Eq. (15)}$$

and the error probability of the second user $P_{er_k}^{(m)}$ is analogously obtained by switching the indices j to k and l to m in Equation (15).

An implementation which may be optimal may be further found by solving an optimization problem:

$$\underset{\{P_j^{(l)}, P_k^{(m)}\}}{\operatorname{argmin}} P_j^{(l)} + P_k^{(m)} \quad \text{Eq. (16)}$$

$$\text{s.t. (so that)} \quad \begin{array}{l} P_j^{(l)}, P_k^{(m)} < P_{max} \\ P_{er_j}^{(l)} \leq \epsilon^{(l)} \\ P_{er_k}^{(m)} \leq \epsilon^{(m)} \end{array}$$

In other words receiver, such as the gNodeB, determines transmit powers for users j and k which are sharing the same slot non-orthogonally, such that the sum of those powers is minimized, while the individual error probabilities as given by e.g. Equation (13) and Equation (14) fulfill the reliability requirements. Embodiments may further put a constraint on the maximum transmit power per device $P_{max}$.

The mechanisms to find optimum power described above constitute a "local" optimization, in that they are performed by the receiver at each feedback stage in order to compute optimal powers for the next round of uplink transmissions and send feedbacks to the UEs. The way the problem is formulated, local optimization takes into account only past replicas of the packet (their effective SINRs) and is solved for fixed error targets. Clearly, a selection of error target will impact the overall efficiency of the system, hence the following "global" optimization which may be implemented as noted in Equation (17) below.

$$\underset{\{\epsilon^{(0)},\ldots,\epsilon^{(L)}\}}{\operatorname{argmin}} E\left[ \sum_{j=1}^{N} \left( P_j^{(0)} + \sum_{l=1}^{L} P_j^{(l)} \prod_{i=0}^{l-1} \epsilon^{(i)} \right) \right] \quad \text{Eq. (17)}$$

$$\text{s.t.} \quad \begin{array}{l} \prod_{l=0}^{L} \epsilon^{(l)} \leq \epsilon_{tar} \\ \sum_{i=\lfloor N/2 \rfloor+1}^{N} \binom{N}{i} \pi_0^{N-i}(1-\pi_0)^i \leq \epsilon_c \end{array}$$

While solving Equation (17) may be computationally heavy, the global error targets can be precomputed offline and do not need to be updated regularly as they depend mainly on the maximum allowed number of retransmissions L and the final block error rate (BLER) target $\epsilon_{tar}$, noting that L and $\epsilon_{tar}$ are system parameters.

Because, in a NOMA HARQ scheme according to embodiments, we combine retransmissions (occurring with a probability $1-\pi_0$) with new packets ($\pi_0$), the constraint on the last line of Equation (17) is there to ensure that situations where the former outnumber the latter is reasonably low. The constraint on the second line of Equation (17) is straightforward, and simply provides that combined error probability after L retransmissions is below the required target.

Figure 3:
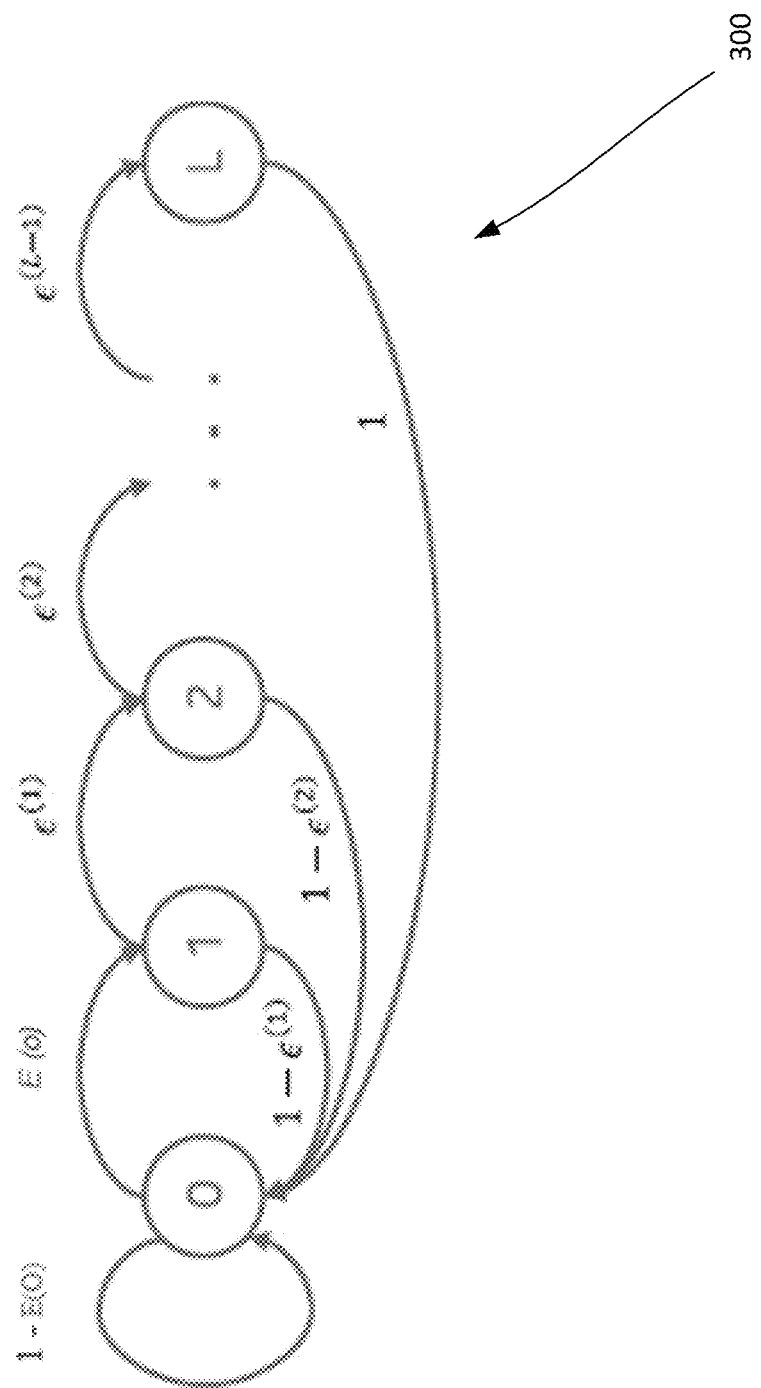
FIG. 3 illustrates a Markov chain of transitions between retransmissions states in an example HARQ feedback scenario.

If we denote the device transmitting the new packet as being in state 0, the device transmitting the first transmission as being in state 1, etc., then the state transition diagram forms a Markov chain 300 as depicted in FIG. 3 and as discussed above. Following a standard approach, we can eventually find the stationary probabilities $(\pi_0, \pi_1, \ldots \pi_L)$ which represent a fraction of time a device spends in each particular state. For our problem, only the first quantity is relevant as we can treat all the other states jointly:

$$\pi_0 = \frac{1}{1 + \sum_{i=0}^{L-1} \prod_{l=0}^{i} \epsilon^{(l)}} \quad \text{Eq. (18)}$$

Since each device follows its own Markov chain independently arriving at the expression at the last line of Equation (17) becomes straightforward and is in fact a complementary cumulative distribution function (CDF) of the binomial distribution that is given by $1-F_{Bnominal}(\lfloor N/2 \rfloor; N, 1-\pi_0)$.

Scheduling Strategy

After each round of transmissions, the receiver may attempt to decode the received packets, such as for example shown by way of operation 204 in FIG. 2. Consequently, the packets that will be transmitted in the following round may be divided into two categories:
  a) replicas of the packets that failed the decoding process i.e. retransmissions; and
  b) new packets, each of which includes both new chunks of data from users that have already transmitted and need continued transmission, and data from new users that just passed the scheduling request and grant procedure.

The resource allocation procedure itself may be broken down into following actions:
  1. scheduling new packets on mutually orthogonal resources subject to the availability of such resources, for example according to the state of the art;
  2. assuming there are K packets requiring retransmission, sorting the packets in the order of descending residual SINR (with the packet being the furthest from the decoding);
  3. selecting K users among the ones that are to transmit new packets, which K user will share their allocated slots with users sending replicas—the selection of the K users among the ones that are to transmit new packets may, according to some embodiments, be done at random, or, based on the distance from the receiver or fading conditions which allow to determine which of them would require the least additional power, or, according to some other embodiments, additional fairness mechanisms may be applied—in the embodiments of NOMA-HARQ described herein, the receiver may keep track of the total transmit power spent by each user, and may determine to always select the K users that spent the least power so far;

4. once the resource allocation is fixed as per items 1-3 above, using Equations (8) and (16) to compute the transmit power for each user; and 5. signaling the resource and power allocation to the users through one or more feedback messages.

Application Example 1: URLLC

Embodiments may be adopted to work with many applications, including very demanding URLLC applications. Following the standard assumptions, we can define the following set of parameters:

TABLE 1

Simulation parameters for NOMA-HARQ in URLLC setting

| | |
|---|---|
| Final BLER $\epsilon_{tar}$ | $10^{-5}$ |
| Maximum number of retransmissions L | 2 |
| Transmission rate R | 1 bit/s/Hz or 1 bit/channel use |
| Number of users N | 20 |
| Channel type | Rayleigh block fading |
| Channel estimation | Perfect |

Although still in the standardization phase and although a final specification is yet to come for URLLC applications, it is realistic to assume that even with short packets (mini-slots composed of 7 or less orthogonal frequency divisional multiplexing (OFDM) symbols) and higher subcarrier-spacing, the number of allowed retransmissions will have to be limited to no more than 1 or 2 so that the challenging latency requirements ranging from 0.5 ms to 2 ms can be met. Furthermore, due to the low payload sizes and required robustness of transmission, the rate in our simulations may be set to 1 bit per channel use.

For the sake of comparison, in the simulations, there are two other techniques which may be used for HARQ-based retransmissions, although, none of these two techniques are as advantageous as the NOMA-HARQ techniques of embodiments:

(1) a fixed power technique, where all transmissions and retransmissions are done on dedicated resources, and where the transmit power is kept constant and chosen in a way that fulfills the overall $10^{-5}$ target error rate; and (2) a legacy power technique, where all transmissions and retransmissions are done on dedicated resources, but where the power is adjusted so that the error rate is around 10% at each stage, similar to traditional HARQ used in Long Term Evolution (LTE), with the exception of the last round which has a significantly higher power to reach the final target error rate of $10^{-5}$.

The results of the performed simulations are shown in Table 2 below, and FIG. 4, which figure shows a graph 400 plotting cumulative distribution function (CDF) of the total power spent on a packet as between the fixed power technique, the legacy technique and the NOMA-HARQ technique according to some embodiments.

TABLE 2

Simulation results for NOMA-HARQ in URLLC setting

| | Effective rate $R_{eff}$ $= R\frac{\text{\#Decoded packets}}{\text{\#used slots}}$ | Average power spent per packet | Average transmit power |
|---|---|---|---|
| Fixed power | $R_{eff} \approx 0.962$ R = 0.962 | 14.17 dBm | 14.00 dBm |
| Legacy | $R_{eff} \approx 0.905$ R = 0.905 | 11.59 dBm | 11.16 dBm |
| Optimal NOMA-HARQ | $R_{eff} \approx$ R = 1 | 13.48 dBm | 12.73 dBm |

Figure 4:
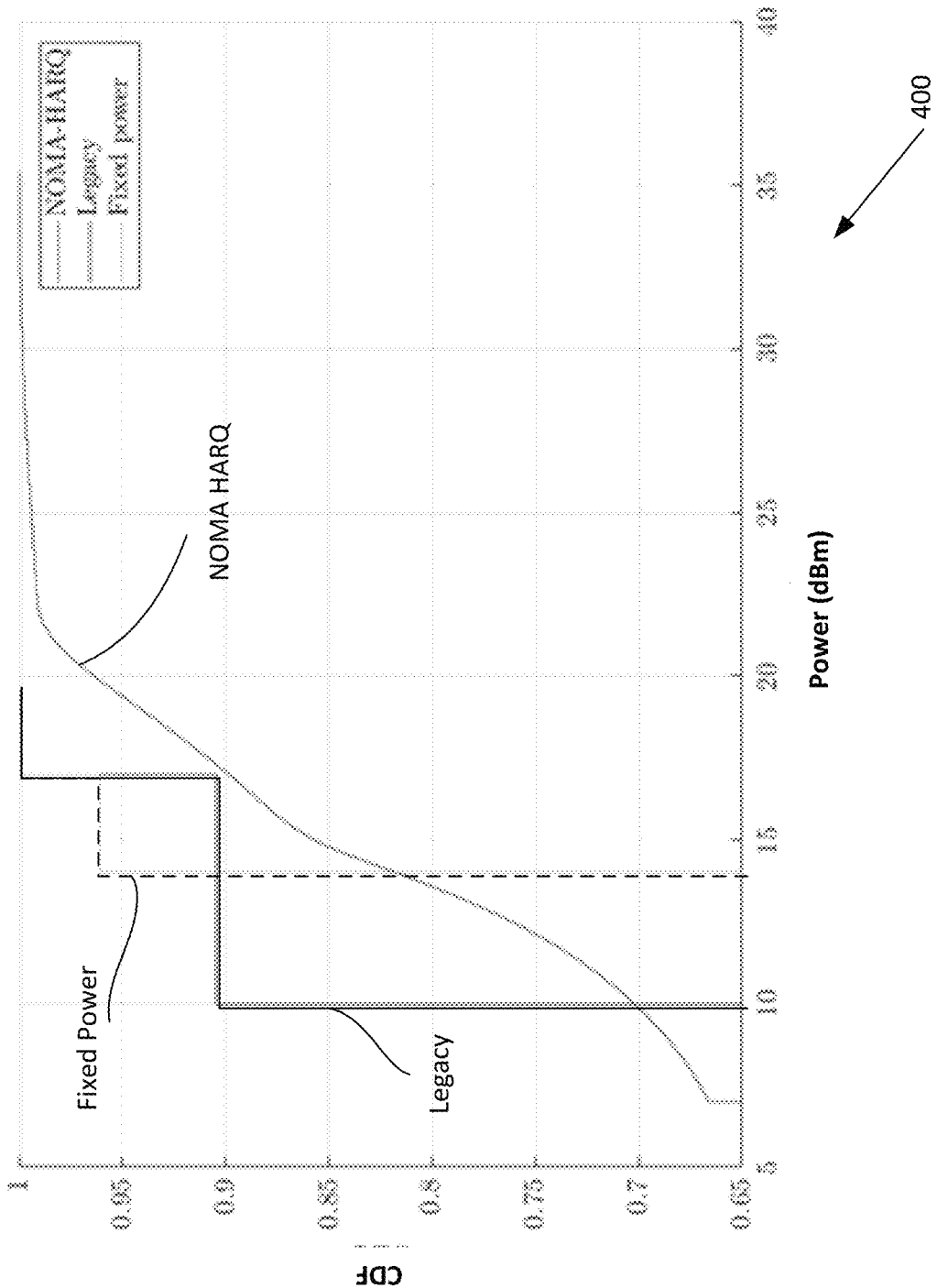
FIG. 4 is a graph plotting cumulative distribution function (CDF) versus total power spent on a packet as between the fixed power technique, the legacy technique and the NOMA-HARQ technique according to some embodiments.

As seen in Table 2 and as shown in FIG. 4, results show that the fixed power technique offers roughly 4% lower spectral efficiency compared to techniques described herein for NOMA-HARQ. In addition to being less spectrally efficient, the fixed power technique also requires higher average transmit power which makes it a strictly inferior implementation in a URLLC setting. On the other hand, the legacy technique offers 2 dBm savings in terms of power compared to NOMA-HARQ but sacrifices 10% of the channel resources as shown by the effective rate of 90%.

Application Example 2: D2D Networks

In some embodiments, the NOMA-HARQ technique may also prove useful in dense device to device (D2D) networks. The requirement is that a user maintain multiple active connections with other users where it serves as a receiver. In the case of decoding failure, the user/receiver will explicitly instruct the corresponding transmitter to perform a next retransmission together with a packet of some other device. Following the standard assumptions, we can define the following set of parameter as shown in Table 3:

TABLE 3

Simulation parameters for NOMA-HARQ in dense D2D network

| | |
|---|---|
| Final BLER $\epsilon_{tar}$ | $10^{-3}$ |
| Maximum number of retransmissions L | 4 |
| Transmission rate R | 2 bit/s/Hz or 2 bit/channel use |
| Number of users N | 100 |
| Channel type | Rayleigh block fading |
| Channel estimation | Perfect |

TABLE 4

Simulation results for NOMA-HARQ in dense D2D network

| | Effective rate $R_{eff}$ $= R\frac{\text{\#Decoded packets}}{\text{\#used slots}}$ | Average power spent per packet | Average transit power |
|---|---|---|---|
| Fixed power | $R_{eff} \approx 0.576$ R $\approx$ 1.15 | 8.5 dBm | 6.1 dBm |
| Legacy* | $R_{eff} \approx 0.899$ R $\approx$ 1.8 | 14.73 dBm | 14.27 dBm |
| Optimal NOMA-HARQ | $R_{eff} \approx 0.999$ R $\approx$ 2 | 13.47 dBm | 11.97 dBm |

Referring to Table 4, because, in the legacy technique, the probability of error is 10% at each round, only 2 retransmissions are necessary to reach target error rate of $10^{-3}$. As shown in Table 4, even higher savings can be achieved when the requirements are more relaxed, as is the case with D2D setting. This time, the legacy implementation is strictly outperformed by NOMA-HARQ and provides 10% lower spectral efficiency while requiring over 1 dBm higher power per packet. Transmitting with fixed power proves to be most power efficient in this case as it allows to spend on average 5 dBm less per packet. This happens at the cost of large number of retransmissions which eventually lead to significant ~42% penalty to the effective rate.

Application Example 3 (System Level Simulations)

In the instant section, the results obtained through system-level simulations will be discussed. The parameters used to obtain the simulations are presented below in Table 5.

TABLE 5

Simulation Parameters

| | |
|---|---|
| Number of UEs N | 40 |
| Number of retransmission L | 1, 2 |
| Final BLER $\epsilon_{tar}$ | $10^{-5}$ |
| Congestion probability $\epsilon_c$ | $10^{-5}$ |
| Transmission rate R | Variable, 0.5-3 bits/channel use |
| Channel Type | Rayleigh block fading |
| Channel estimation method | Perfect |

In addition to the introduced NOMA-HARQ approach, we have investigated the performance of two other techniques which both rely on a legacy OMA paradigm. In those baseline schemes, each transmission will occur on dedicated resources. Consequently, in each round, all N subcarriers are being used, carrying either a new packet or a retransmission. The OMA strategies, as noted above, may be subdivided into two sub-types:
  (1) Fixed power as described above, where each packet uses the same power and its value is chosen such that the final error rate is fulfilled; and
  (2) Optimized power, where the transmit power is optimized according to the same procedure as described above with respect to embodiments, where local and global optimization are employed but where the global optimization requires only Equation (8).

Although latency is not explicitly addressed in the instant simulation, the performance of the simulated schemes herein were analyzed under very limited number of allowed retransmissions.

Figure 5:
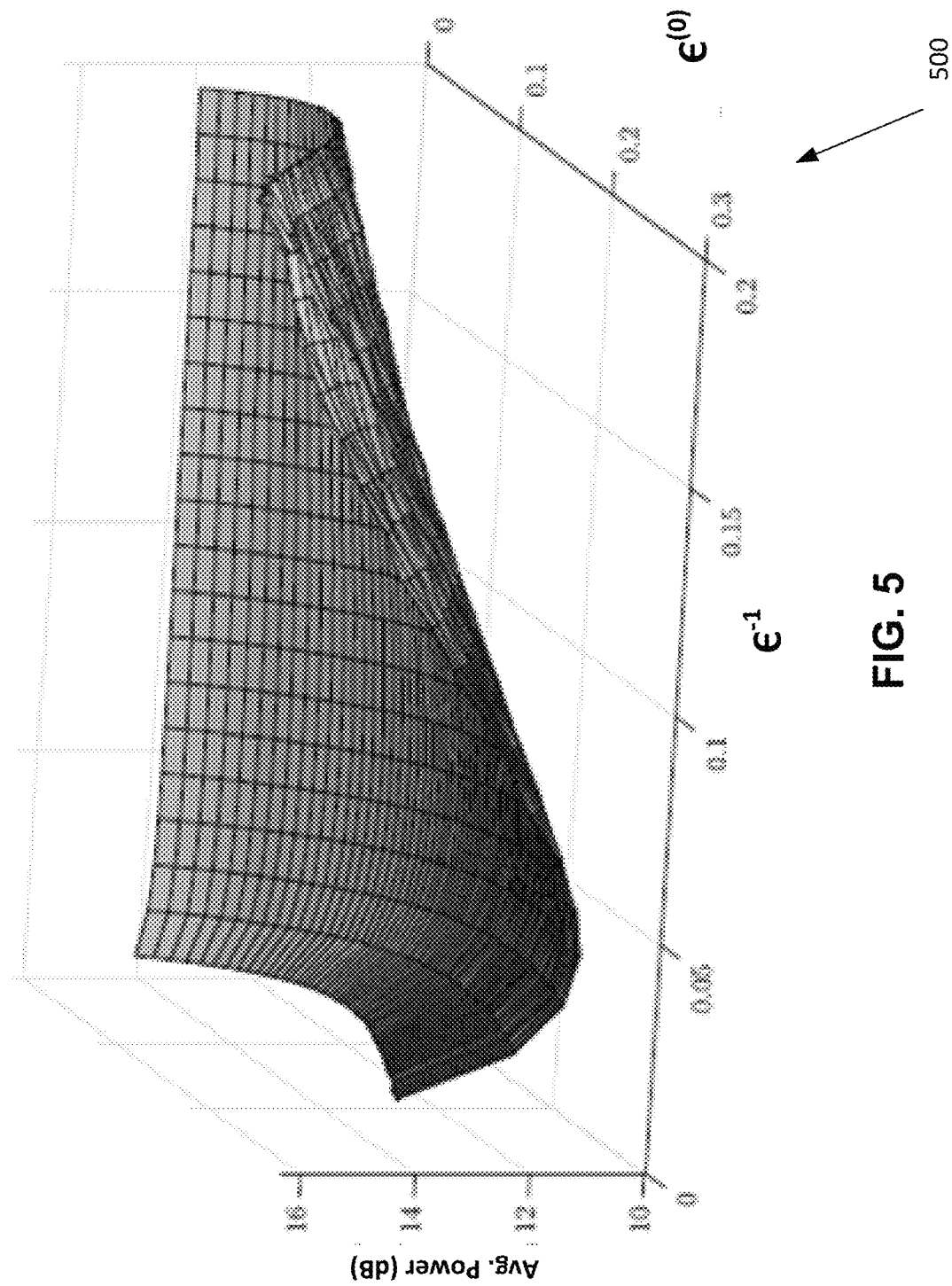
FIG. 5 is a graph of the dependency between the selected global target error rates E and the average of power spent per packet according to some embodiments.

In FIG. 5, graph 500 shows the dependency between the selected global target error rates E and the average of power spent per packet, which is the visualization of the performed optimization at Equation (17) in the case of L=2 allowed retransmissions. FIG. 5 shows the average power as a function of $\epsilon^{(0)}$ and $\epsilon^{(1)}$ for L=2, R=1, under the constraints of Table 5 above. An example of the global optimization is where the minimum is achieved for $\epsilon^{(0)}$=0.16, $\epsilon^{(1)}$=0.05 and consequently $\epsilon^{(2)}$=0.00125.

Figure 6:
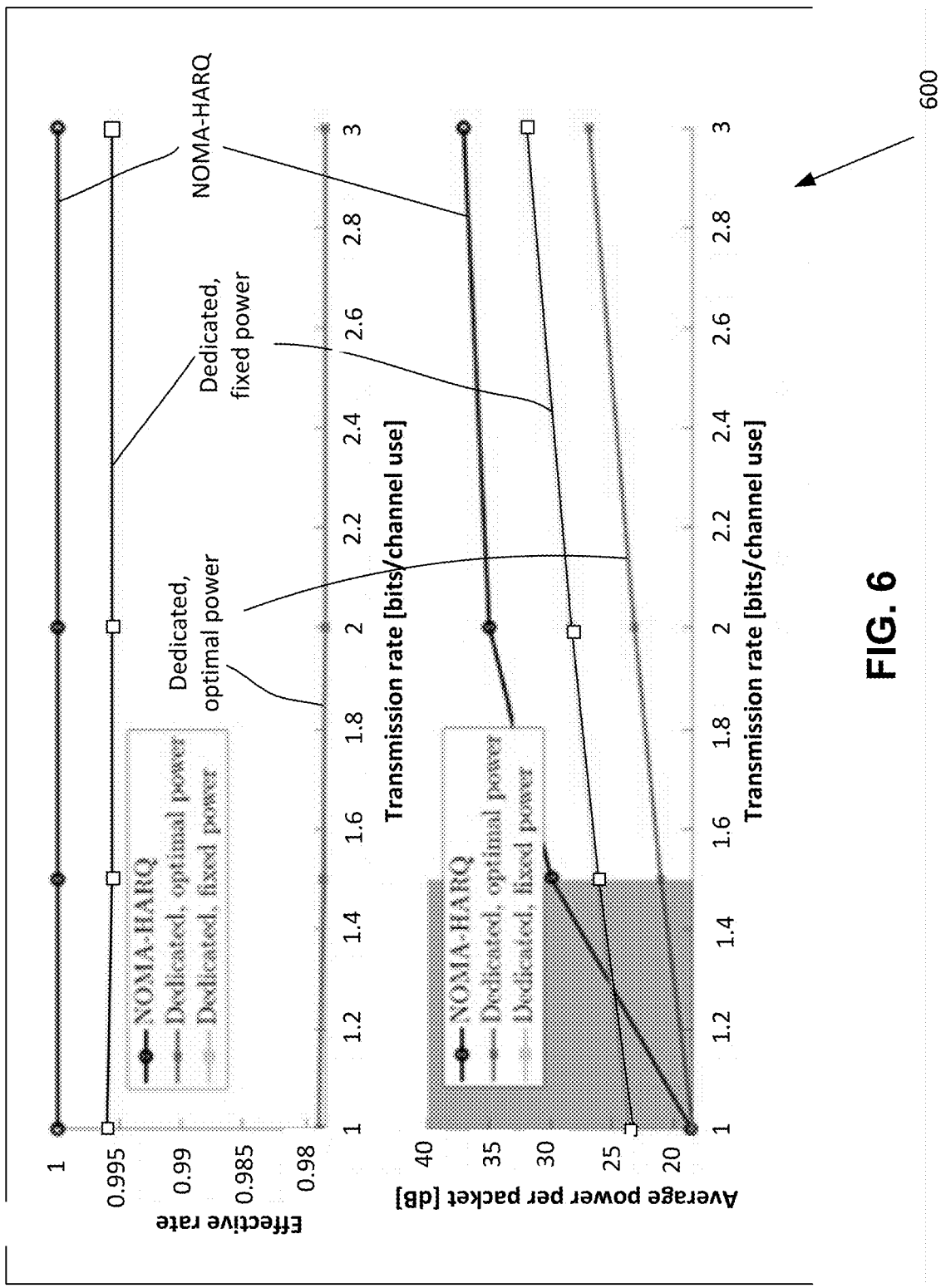
FIG. 6 is a graph of the average power spent per packet and effective rate comparison in the case of a maximum number L of allowed retransmissions equal to 1.
Figure 7:
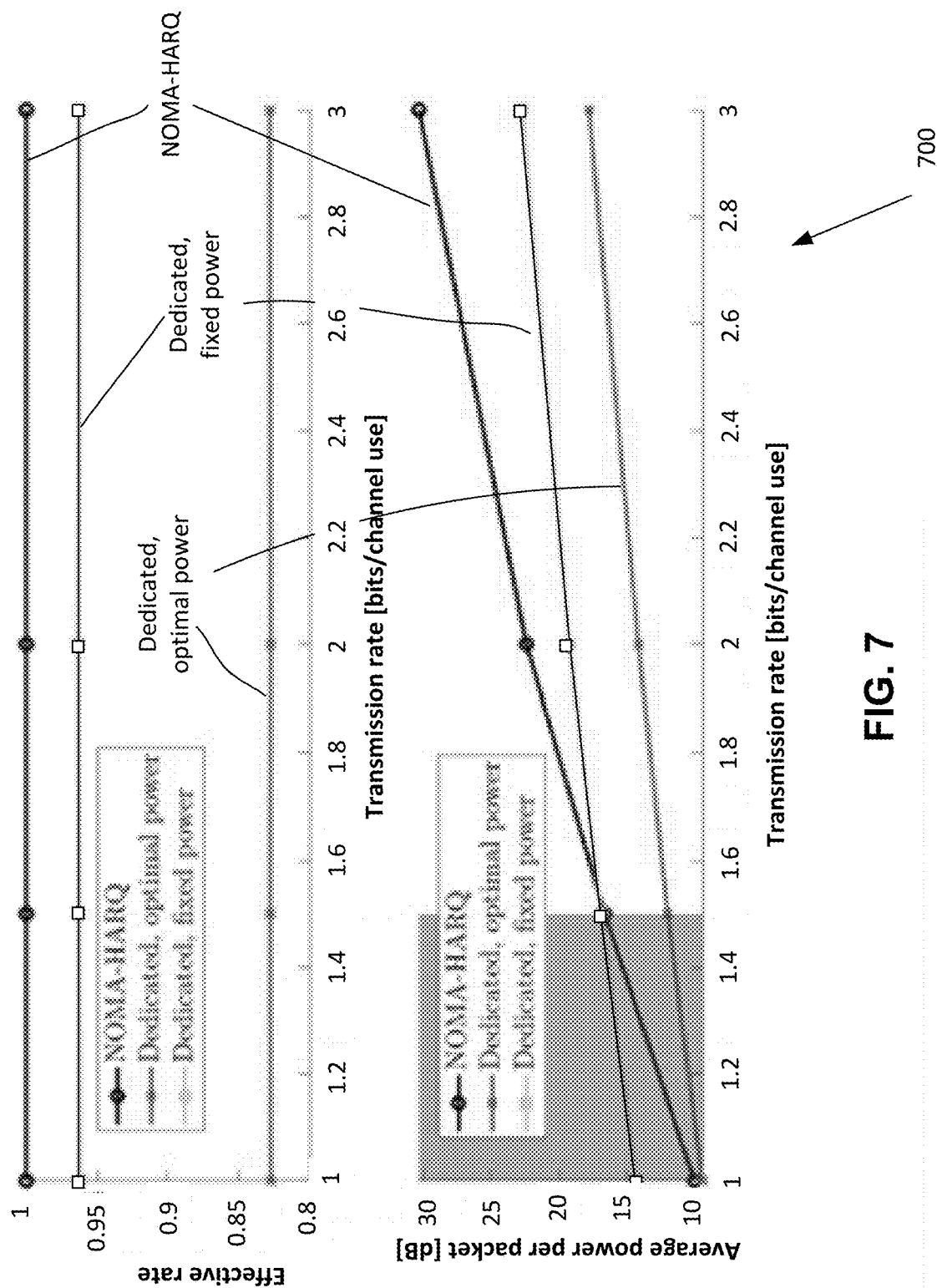
FIG. 7 is a graph of the average power spent per packet and effective rate comparison in the case of a maximum number L of allowed retransmissions equal to 2.

The core of the result is shown in FIG. 6 and FIG. 7, where we present the average power and effective rate performance of the discussed techniques. We define the latter as the ratio between the number of successfully decoded packets divided by the total number of used slots. As shown in FIG. 6, graph 600 shows the average power spent per packet and effective rate comparison in the case of maximum L=1, and in FIG. 7, graphs 700 show the average power spent per packet and effective rate comparison in the case of maximum L=2.

As we can see, in the case of a single retransmission, the effective rate gains with NOMA-HARQ are rather limited. This is justified, as the effective rate is mostly determined by the initial $\epsilon^{(0)}$ which has to be already quite low in the first attempt. Compared to the dedicated approach with optimal power, the savings in terms of bandwidth (scheduled slots) reach 2%.

With respect to the average power, NOMA-HARQ proves to work best in the low rate regime (which is marked in the grey region on both of FIGS. 6 and 7). In fact, up to a certain point, NOMA-HARQ provides the same level of reliability to users while requiring less energy than OMA with fixed power and initially even approaching the optimal OMA.

In FIG. 7, we can more readily observe the attractiveness of the proposed technique according to embodiments. As the number of allowed retransmissions rises to 2, the value of initial target EM becomes less stringent, giving more headroom for improvement. Compared with the fixed power and optimal OMA, the presented NOMA-HARQ allows to save respectively 4% and 18% of bandwidth resources. In addition, the range of rates over which NOMA-HARQ outperforms the fixed power OMA, also in terms of average power, increases to 1.5 bits/ch·u. It is important to realize why there is a region of rates over which NOMA-HARQ performs particularly well, and this becomes immediately clear when looking at the solution at Equation (15). Whenever the product of residual SINRs is below 1, the error probability for both use cases is reduced and consequently, achieving a certain target rate requires less power.

Figure 8:
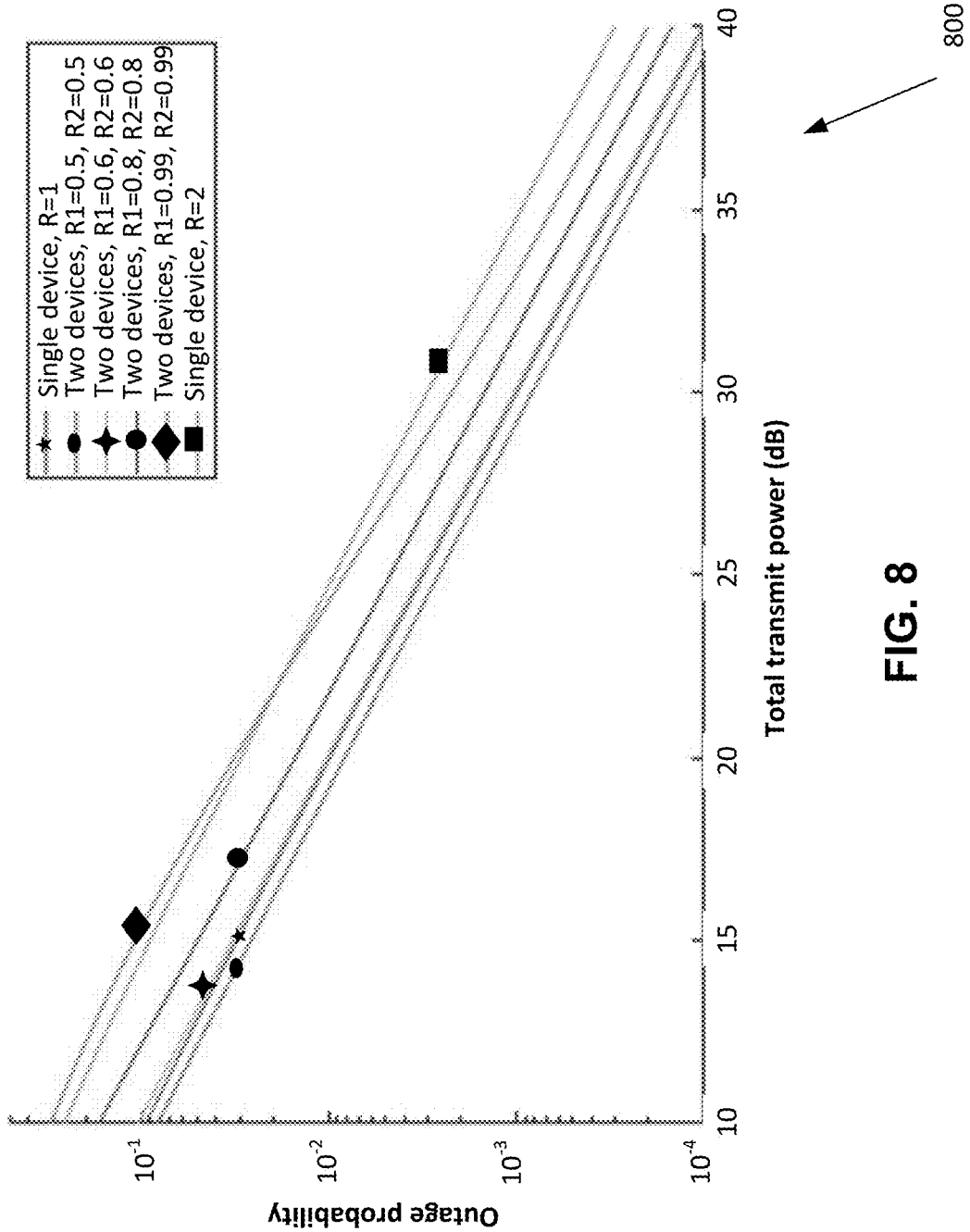
FIG. 8 is a graph of the achievable outage probability as a function of the transmit power when a single transmission is performed with a low rate.

FIG. 8, which is motivated by the finding above, shows a graph 800 of the achievable outage probability as a function of the transmit power when a single (so-called one-shot) transmission is performed with low rate. Similarly, as before, we are interested in the performance of the single device using a dedicated resource, and of two devices sharing the slot. To achieve fairness, in the case of two users, their transmit powers are adjusted so that the sum matches that of a single user. The particular values are found by solving a min-max problem. For example, the maximum of the tuple $(\vec{P}_{er_1}, \vec{P}_{er_2})$ is minimized according to the following set of equations:

$$\min_{\{P_1, P_2\}} \max_{i=1,2}(P_{er_i}) \qquad \text{Eq. (19)}$$
$$\text{s.t. } P_1 + P_2 = P_{max}$$

As shown in FIG. 8, with NOMA-HARQ, two devices can share the same physical resources while having the same sum rate and using the same amount of power as the traditional OMA user, and yet achieve lower outage probability (line marked with an oval and line marked with a star). If we decide to keep the same error rate as a single device, then the rate of both coexisting users can be increased to 0.6, giving a total boost of 20% in terms of sum rate. Similarly, we can compare one user transmitting with rate 2 and two users transmitting with rates close to 1 (consequence of Equation (15)). The visible crossing point around 22 dB is due to the fact that below this amount, there is not enough power for NOMA to split it optimally between the 2 users.

Example Test Cases

Embodiments described herein may be implemented in a receiver, such as in a gNodeB, which could be tested with a controlled and coupled set of at least two transmitting devices (such as UEs). The test comprises transmitting packets and observing the allocation signaled by the receiver. If two devices obtain the same allocation of time-frequency resources for their next transmissions where one of them is a retransmission and the other is a new packet, this is a strong indication that a competitor might have copied the technique. Moreover, in embodiments, the receiver may not ask for two new packets to share the same resources.

Determining how exactly the power optimization is performed is more complex. In addition to controlling the transmitters, a tester may also measure the received power of their corresponding signals at the receiver (e.g., by placing another antenna close enough to obtain sufficiently high correlation). Knowing the powers, Equations (8) and (16) may be repeated independently and compared with values reported in the feedback message from the receiver to the transmitters.

Embodiment Set of a Procedure:

Assume there are in total N packets that need to be transmitted, out of which K are retransmissions and consequently a remaining N-K are new packets. In such a case, each of the N-K new packets may be assigned dedicated, mutually orthogonal resources/slots as usual (i.e. such as happens in LTE based on OFDM). Because in proposed NOMA-HARQ embodiments described herein, retransmissions are not assigned dedicated resources and instead there is a pairing of 1 retransmission with 1 new packet, then the procedure is to further sub-select K out of the N-K new packets that will be asked to share their resources. Note that this in principle requires that N>=2K, but in practice the number of failed packets K is typically much smaller than the total number N in any event. According to some embodiments, the sub-selection may be: a random K new packets; or the K packets whose owners spent least power so far; or the K packets whose owners are the closest to the receiver/have most favorable fading conditions entailing the least additional power; or some other fairness mechanism may be used.

Sorting K retransmission packets in order of descending residual SINR may be necessary if we want to assign them to those K new packets whose senders have used the least power so far. We do not need to do that if the K retransmissions are going to be randomly assigned to the K new packets among the N-K available ones.

Once the scheduling actions described above are completed the following packets may be determined in the system: (1) N-2K new packets that occupy N-2K mutually orthogonal resources/slots—for each of them, transmit power may be computed using Equation (8) above; and (2) K pairs (1 retransmission+1 new packet) that will occupy K mutually orthogonal resources/slots. Within the slot for each of the K pairs, retransmission and new packet may not be orthogonal as they have to share the slot. For each pair, Equations (15) and (16) may be used to determine the optimal powers of the constituting packets.

In embodiments, procedures and apparatuses may:

(1) be able to identify and distinguish between new packets and retransmissions;

(2) be able to schedule new packets and potentially also retransmissions on mutually orthogonal resources. If, instead, retransmissions are scheduled together with new packets in the same time frequency resource, then the NOMA-HARQ according to embodiments may be used. Here, the point is that the receiver (who is also a scheduler) may not be limited to use only a NOMA-HARQ approach, but may be able revert to the legacy approach. NOMA-HARQ functionality allows to merge some of the packets and free up some resources, but if the system is underutilized there might be no reason to do this;

(3) be able to sort packets which are retransmissions of previously failed packet in the order of descending residual SINR;

(4) be able to select K candidate users for sharing their allocated slots with users sending replicas in retransmissions;

(5) be able to send to each user (to all users, and not only to K users) scheduling messages with bandwidth allocation and transmit power; and/or (6) be able to compute appropriate transmit power for each user, where the selected computation method depends on whether a user is alone in the slot or is sharing it with another packet.

Figure 9:
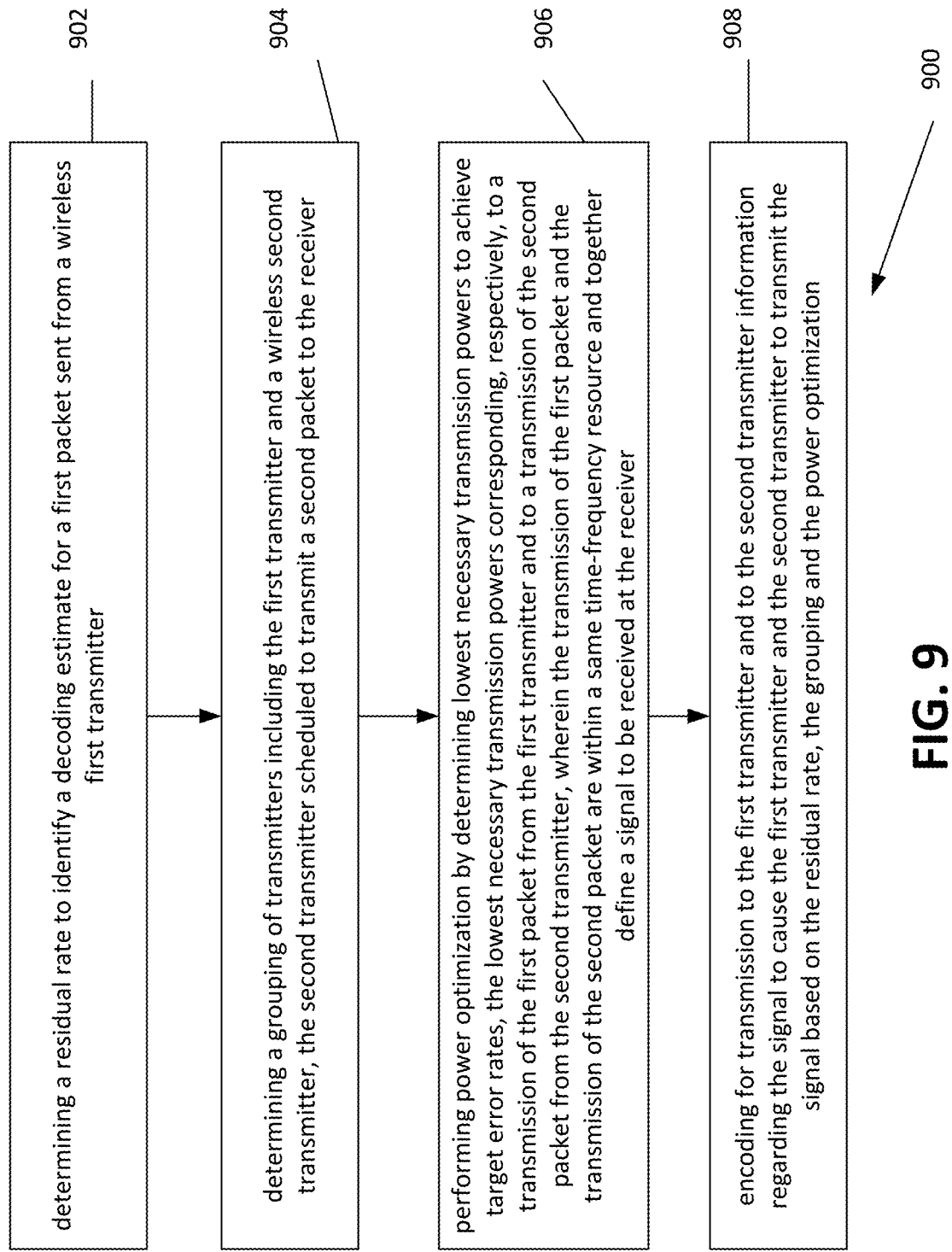
FIG. 9 illustrates a flow chart of a process according to some embodiments.

FIG. 9 shows a process 900 according to one embodiment. As seen in FIG. 9, process 900 includes, at operation 902, determining a residual rate to identify a decoding estimate for a first packet sent from a wireless first transmitter; at operation 904, determining a grouping of transmitters including the first transmitter and a wireless second transmitter, the second transmitter scheduled to transmit a second packet to the receiver; at operation 906, performing power optimization by determining lowest necessary transmission powers to achieve target error rates, the lowest necessary transmission powers corresponding, respectively, to a transmission of the first packet from the first transmitter and to a transmission of the second packet from the second transmitter, wherein the transmission of the first packet and the transmission of the second packet are within a same time-frequency resource and together define a signal to be received at the receiver; and at operation 908, encoding for transmission to the first transmitter and to the second transmitter information regarding the signal to cause the first transmitter and the second transmitter to transmit the signal based on the residual rate, the grouping and the power optimization.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1001a and UE 1001b (collectively referred to as "UEs 1001" or "UE 1001"). In this example, UEs 1001 are illustrated as smartphones, but may also comprise any mobile or non-mobile computing device.

The UEs 1001 may be configured to connect, for example, communicatively couple, with an or RAN 1010. In embodiments, the RAN 1010 may be an NG RAN or a 5G RAN, an E-UTRAN, or a legacy RAN, such as a UTRAN or GERAN. As used herein, the term "NG RAN" or the like may refer to a RAN 1010 that operates in an NR or 5G system 1000, and the term "E-UTRAN" or the like may refer to a RAN 1010 that operates in an LTE or 4G system 1000. The UEs 1001 utilize connections (or channels) 1003 and 1004, respectively, each of which comprises a physical communications interface or layer (discussed in further detail below).

In this example, the connections 1003 and 1004 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1001 may directly exchange communication data via a ProSe interface 1005. The ProSe interface 1005 may alternatively be referred to as a SL interface 1005 and may comprise one or more logical channels, including but not limited to a PSCCH, a PSSCH, a PSDCH, and a PSBCH.

The UE 1001b is shown to be configured to access an AP 1006 (also referred to as "WLAN node 1006," "WLAN 1006," "WLAN Termination 1006," "WT 1006" or the like) via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below).

The RAN 1010 can include one or more AN nodes or RAN nodes 1011a and 1011b (collectively referred to as "RAN nodes 1011" or "RAN node 1011") that enable the connections 1003 and 1004. As used herein, the terms "access node," "access point," or the like may describe equipment that provides the radio baseband functions for data and/or voice connectivity between a network and one or more users. These access nodes can be referred to as BS, gNodeBs, RAN nodes, eNBs, NodeBs, RSUs, TRxPs or TRPs, and so forth. As used herein, the term "NG RAN node" or the like may refer to a RAN node 1011 that operates in an NR or 5G system 1000 (for example, a gNB), and the term "E-UTRAN node" or the like may refer to a RAN node 1011 that operates in an LTE or 4G system 1000 (e.g., an eNB). According to various embodiments, the RAN nodes 1011 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In embodiments, the UEs 1001 can be configured to communicate using OFDM communication signals with each other or with any of the RAN nodes 1011 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 to the UEs 1001, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1001 and the RAN nodes 1011, 1012 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

The RAN nodes 1011 may be configured to communicate with one another via interface 1012. In embodiments where the system 1000 is a 5G or NR system, the interface 1012 may be an Xn interface 1012. The Xn interface is defined between two or more RAN nodes 1011 (e.g., two or more gNodeBs or gNBs and the like) that connect to 5GC 1020, between a RAN node 1011 (e.g., a gNB) connecting to 5GC 1020 and an eNB, and/or between two eNBs connecting to 5GC 1020.

The RAN 1010 is shown to be communicatively coupled to a core network—in this embodiment, core network (CN) 1020. The CN 1020 may comprise a plurality of network elements 1022, which are configured to offer various data and telecommunications services to customers/subscribers (e.g., users of UEs 1001) who are connected to the CN 1020 via the RAN 1010. The components of the CN 1020 may be implemented in one physical node or separate physical nodes including components to read and execute instructions from a machine-readable or computer-readable medium (e.g., a non-transitory machine-readable storage medium).

Generally, the application server 1030 may be an element offering applications that use IP bearer resources with the core network (e.g., UMTS PS domain, LTE PS data services, etc.). The application server 1030 can also be configured to support one or more communication services (e.g., VoIP sessions, PTT sessions, group communication sessions, social networking services, etc.) for the UEs 1001 via the EPC 1020.

In embodiments, the CN 1020 may be a 5GC (referred to as "5GC 1020" or the like), and the RAN 1010 may be connected with the CN 1020 via an NG interface 1013. In embodiments, the NG interface 1013 may be split into two parts, an NG user plane (NG-U) interface 1014, which carries traffic data between the RAN nodes 1011 and a UPF, and the S1 control plane (NG-C) interface 1015, which is a signaling interface between the RAN nodes 1011 and AMFs. Embodiments where the CN 1020 is a 5GC 1020 are discussed in more detail with regard to Figure XR2.

In embodiments, the CN 1020 may be a 5G CN (referred to as "5GC 1020" or the like), while in other embodiments, the CN 1020 may be an EPC). Where CN 1020 is an EPC (referred to as "EPC 1020" or the like), the RAN 1010 may be connected with the CN 1020 via an S1 interface 1013. In embodiments, the S1 interface 1013 may be split into two parts, an S1 user plane (S1-U) interface 1014, which carries traffic data between the RAN nodes 1011 and the S-GW, and the S1-MME interface 1015, which is a signaling interface between the RAN nodes 1011 and MMEs. An example architecture wherein the CN 1020 is an EPC 1020 is shown by Figure XR1.

Figure 11:
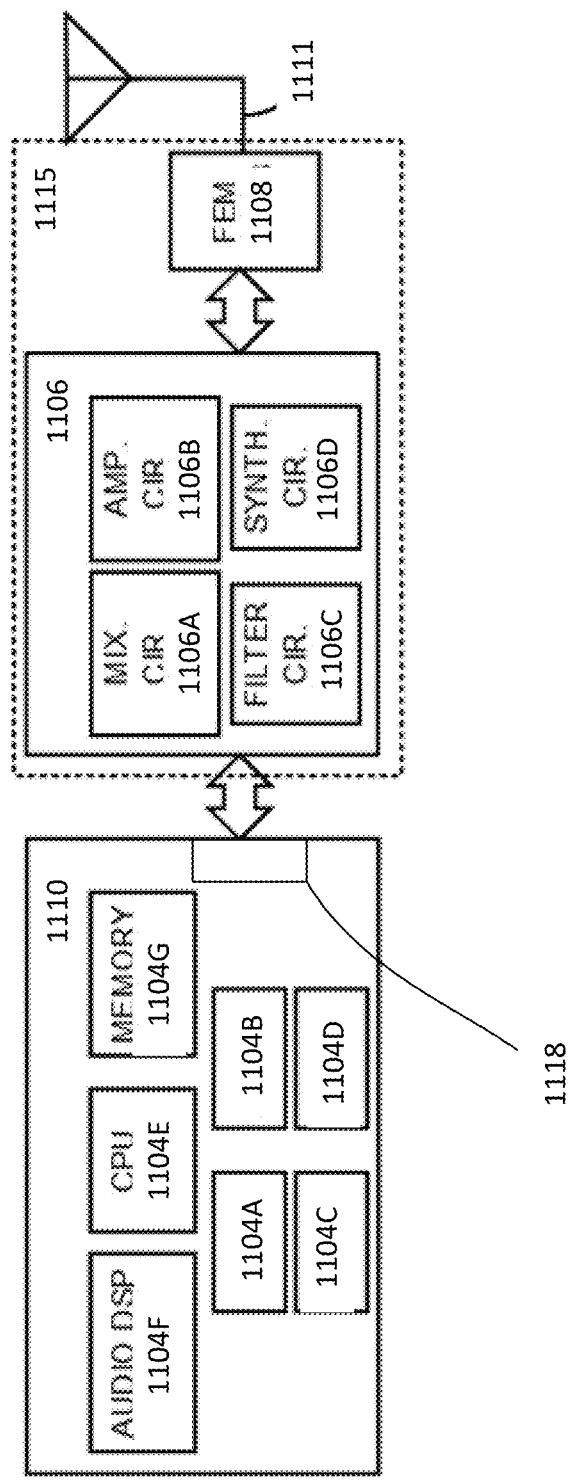
FIG. 11 illustrates example components of baseband circuitry and radio front end modules (RFEM) 1115 in accordance with various embodiments.

FIG. 11 illustrates example components of baseband circuitry 1110 and radio front end modules (RFEM) 1115 in accordance with various embodiments. Baseband circuitry 1110 includes a RF interface 1118 connecting it to the RFEM. As shown, the RFEMs 1115 may include Radio Frequency (RF) circuitry 1106, front-end module (FEM) circuitry 1108, antenna array 1111 coupled together at least as shown.

The baseband circuitry 1110 includes circuitry and/or control logic configured to carry out various radio/network protocol and radio control functions that enable communication with one or more radio networks via the RF circuitry 1106. The radio control functions may include, but are not limited to, signal modulation/demodulation, encoding/decoding, radio frequency shifting, etc. In some embodiments, modulation/demodulation circuitry of the baseband circuitry 1110 may include Fast-Fourier Transform (FFT), precoding, or constellation mapping/demapping functionality. In some embodiments, encoding/decoding circuitry of the baseband circuitry 1110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1110 is configured to process baseband signals received from a receive signal path of the RF circuitry 1106 and to generate baseband signals for a transmit signal path of the RF circuitry 1106. The baseband circuitry 1110 is configured to interface with an application circuitry for generation and processing of the baseband signals and for controlling operations of the RF circuitry 1106. The baseband circuitry 1110 may handle various radio control functions.

The aforementioned circuitry and/or control logic of the baseband circuitry 1110 may include one or more single or multi-core processors. For example, the one or more processors may include a 3G baseband processor 1104A, a 4G/LTE baseband processor 1104B, a 5G/NR baseband processor 1104C, or some other baseband processor(s) 1104D for other existing generations, generations in development or to be developed in the future (e.g., sixth generation (6G), etc.). In other embodiments, some or all of the functionality of baseband processors 1104A-D may be included in modules stored in the memory 1104G and executed via a Central Processing Unit (CPU) 1104E. In other embodiments, some or all of the functionality of baseband processors 1104A-D may be provided as hardware accelerators (e.g., FPGAs, ASICs, etc.) loaded with the appropriate bit streams or logic blocks stored in respective memory cells. In various embodiments, the memory 1104G may store program code of a real-time OS (RTOS), which when executed by the CPU 1104E (or other baseband processor), is to cause the CPU 1104E (or other baseband processor) to manage resources of the baseband circuitry 1110, schedule tasks, etc. In addition, the baseband circuitry 1110 includes one or more audio digital signal processor(s) (DSP) 1104F. The audio DSP(s) 1104F include elements for compression/decompression and echo cancellation and may include other suitable processing elements in other embodiments.

In some embodiments, each of the processors 1104A-1104E include respective memory interfaces to send/receive data to/from the memory 1104G. The baseband circuitry 1110 may further include one or more interfaces to communicatively couple to other circuitries/devices RF circuitry 1106 may enable communication with wireless networks using modulated electromagnetic radiation through a non-solid medium.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1110 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

FEM circuitry 1108 may include a receive signal path, which may include circuitry configured to operate on RF signals received from antenna array 1111, amplify the received signals and provide the amplified versions of the received signals to the RF circuitry 1106 for further processing. FEM circuitry 1108 may also include a transmit signal path, which may include circuitry configured to amplify signals for transmission provided by the RF circuitry 1106 for transmission by one or more of antenna elements of antenna array 1111. In various embodiments, the amplification through the transmit or receive signal paths may be done solely in the RF circuitry 1106, solely in the FEM circuitry 1108, or in both the RF circuitry 1106 and the FEM circuitry 1108.

The antenna array 1111 comprises one or more antenna elements, each of which is configured convert electrical signals into radio waves to travel through the air and to convert received radio waves into electrical signals. For example, digital baseband signals provided by the baseband circuitry 1110 is converted into analog RF signals (e.g., modulated waveform) that will be amplified and transmitted via the antenna elements of the antenna array 1111 including one or more antenna elements (not shown). The antenna elements may be omnidirectional, direction, or a combination thereof. The antenna elements may be formed in a multitude of arranges as are known and/or discussed herein. The antenna array 1111 may comprise microstrip antennas or printed antennas that are fabricated on the surface of one or more printed circuit boards. The antenna array 1111 may be formed in as a patch of metal foil (e.g., a patch antenna) in a variety of shapes, and may be coupled with the RF circuitry 1106 and/or FEM circuitry 1108 using metal transmission lines or the like.

One or more of the components of FIGS. 10 and/or 11, may be used in any of the embodiments described herein.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 includes a device of a wireless receiver, the device including a Radio Frequency (RF) interface, and processing circuitry coupled to the RF interface, the processing circuitry to: determine a residual rate to identify a decoding estimate for a first packet sent from a wireless first transmitter; determine a grouping of transmitters including the first transmitter and a wireless second transmitter scheduled to transmit a second packet to the receiver; perform power optimization by determining lowest necessary transmission powers to achieve target error rates, the lowest necessary transmission powers corresponding, respectively, to a transmission of the first packet from the first transmitter and to a transmission of the second packet from the second transmitter, wherein the transmission of the first packet and the transmission of the second packet are within a same time-frequency resource and together define a signal to be received at the receiver; and encode for transmission to the first transmitter and to the second transmitter information regarding the signal to cause the first transmitter and the second transmitter to transmit the signal based on the residual rate, the grouping and the power optimization.

Example 2 includes the subject matter of Example 1, and optionally, wherein power optimization includes at least one of local optimization performed each time the information regarding the signal is to be encoded for transmission, or global optimization based on global target error rates computed by the receiver.

Example 3 includes the subject matter of Example 1, and optionally, the processing circuitry further to, prior to grouping, identify one or more new packets to be transmitted thereto and one or more retransmission packets to be transmitted thereto, wherein: the first transmitter includes one or more first transmitters; the first packet includes the one or more retransmission packets from respective ones of the one or more first transmitters; the second transmitter includes one or more second transmitters; the second packet includes the one or more new packets from respective ones of the one or more second transmitters; and the signal includes one or more signals, each of the one or more signals including one of the one or more retransmission packets and one of the one or more new packets in a same time frequency resource.

Example 4 includes the subject matter of Example 3, and optionally, the processing circuitry further to schedule the one or more signals on mutually orthogonal time frequency resources.

Example 5 includes the subject matter of Example 4, and optionally, the processing circuitry further to determine availability of the mutually orthogonal time frequency resources prior to scheduling.

Example 6 includes the subject matter of Example 3, and optionally, wherein the one or more retransmission packets include K retransmission packets, the processing circuitry further to sort a scheduling of the K retransmission packets based on a descending order of respective residual signal to noise ratios (SNRs) for the K retransmission packets.

Example 7 includes the subject matter of Example 3, and optionally, wherein the one or more first transmitters include a plurality of first transmitters, the one or more second transmitters include a plurality of second transmitters, and the one or more signals include a plurality of signals, the processing circuitry to: select a number K of the plurality of second transmitters (K second transmitters) to share respective time frequency resources with respective ones of the plurality of first transmitters, each of the respective time frequency resources allocated to a respective one of the plurality of signals; and encode for transmission to the K second transmitters a request to share the respective time frequency resources.

Example 8 includes the subject matter of Example 7, and optionally, wherein the processing circuitry is to select the K second transmitters based on: random selection; distance or fading conditions which allow to determine which of the second transmitters would require the least additional power; a fairness-based selection mechanism; or which of the second transmitters have used a least amount of power.

Example 9 includes the subject matter of Example 7, and optionally, the processing circuitry to perform power optimization for the plurality of signals from the K second transmitters.

Example 10 includes the subject matter of Example 1, and optionally, wherein the second packet corresponds to a retransmission packet or to a new packet.

Example 11 includes the subject matter of Example 10, and optionally, wherein the second packet is a new packet, and wherein the second transmitter is a transmitter that has sent packets to the receiver, or a new transmitter that has just passed a scheduling request and grant procedure with the receiver.

Example 12 includes the subject matter of any one of Examples 1-11, and optionally, wherein the receiver is one of a cellular base station or a cellular User Equipment (UE) adapted to operate in a device to device (D2D) setting, and wherein the first transmitter and the second transmitter include, respectively, a first UE and a second UE.

Example 13 includes the subject matter of Example 1, and optionally, further includes a front end module coupled to the RF interface.

Example 14 includes the subject matter of Example 13, and optionally, further including one or more antennas coupled to the front end module.

Example 15 includes a method to be implemented at a device of a wireless receiver, the device including a Radio Frequency (RF) interface, and processing circuitry coupled to the RF interface, the method including: determining a residual rate to identify a decoding estimate for a first packet sent from a wireless first transmitter; determining a grouping of transmitters including the first transmitter and a wireless second transmitter, the second transmitter scheduled to transmit a second packet to the receiver; performing power optimization by determining lowest necessary transmission powers to achieve target error rates, the lowest necessary transmission powers corresponding, respectively, to a transmission of the first packet from the first transmitter and to a transmission of the second packet from the second transmitter, wherein the transmission of the first packet and the transmission of the second packet are within a same time-frequency resource and together define a signal to be received at the receiver; and encoding for transmission to the first transmitter and to the second transmitter information regarding the signal to cause the first transmitter and the second transmitter to transmit the signal based on the residual rate, the grouping and the power optimization.

Example 16 includes the subject matter of Example 15, and optionally, wherein power optimization includes at least one of local optimization performed each time the information regarding the signal is to be encoded for transmission, or global optimization based on global target error rates computed by the receiver.

Example 17 includes the subject matter of Example 15, and optionally, the method further including, prior to grouping, identifying one or more new packets to be transmitted thereto and one or more retransmission packets to be transmitted thereto, wherein: the first transmitter includes one or more first transmitters; the first packet includes the one or more retransmission packets from respective ones of the one or more first transmitters; the second transmitter includes one or more second transmitters; the second packet includes the one or more new packets from respective ones of the one or more second transmitters; and the signal includes one or more signals, each of the one or more signals including one of the one or more retransmission packets and one of the one or more new packets in a same time frequency resource.

Example 18 includes the subject matter of Example 17, and optionally, the method further including scheduling the one or more signals on mutually orthogonal time frequency resources.

Example 19 includes the subject matter of Example 18, and optionally, the method further including determining availability of the mutually orthogonal time frequency resources prior to scheduling.

Example 20 includes the subject matter of Example 17, and optionally, wherein the one or more retransmission packets include K retransmission packets, the method further including sorting a scheduling of the K retransmission packets based on a descending order of respective residual signal to noise ratios (SNRs) for the K retransmission packets.

Example 21 includes the subject matter of Example 17, and optionally, wherein the one or more first transmitters include a plurality of first transmitters, the one or more second transmitters include a plurality of second transmitters, and the one or more signals include a plurality of signals, the method further including: selecting a number K of the plurality of second transmitters (K second transmitters) to share respective time frequency resources with respective ones of the plurality of first transmitters, each of the respective time frequency resources allocated to a respective one of the plurality of signals; and encoding for transmission to the K second transmitters a request to share the respective time frequency resources.

Example 22 includes the subject matter of Example 21, and optionally, the method further including selecting the K second transmitters based on: random selection; distance or fading conditions which allow to determine which of the second transmitters would require the least additional power; a fairness-based selection mechanism; or which of the second transmitters have used a least amount of power.

Example 23 includes the subject matter of Example 21, and optionally, the method including performing power optimization for the plurality of signals from the K second transmitters.

Example 24 includes the subject matter of Example 15, and optionally, wherein the second packet corresponds to a retransmission packet or to a new packet.

Example 25 includes the subject matter of Example 24, and optionally, wherein the second packet is a new packet, and wherein the second transmitter is a transmitter that has sent packets to the receiver, or a new transmitter that has just passed a scheduling request and grant procedure with the receiver.

Example 26 includes the method of any one of Examples 15-25, and optionally, wherein the receiver is one of a cellular base station or a cellular User Equipment (UE) adapted to operate in a device to device (D2D) setting, and wherein the first transmitter and the second transmitter include, respectively, a first UE and a second UE.

Example 27 includes a device of a wireless first transmitter, the device including a Radio Frequency (RF) interface, and processing circuitry coupled to the RF interface, the processing circuitry to: decode information from a wireless receiver, the information regarding a signal to be sent to the receiver, the signal including a first transmission from the first transmitter and a second transmission from a second transmitter in a same time frequency resource as the first transmission, the information including scheduling information regarding the time frequency resource, and information regarding a lowest necessary transmission power for the first transmission and for the second transmission, the lowest necessary transmission power to achieve target error rates, the information further being based on a residual rate to identify a decoding estimate for the first transmission at the receiver; and encode the first transmission for transmission to the receiver within the signal based on the information.

Example 28 includes the subject matter of Example 27, and optionally, the processing circuitry to decode a request from the receiver to share the time frequency resource with the second transmitter.

Example 29 includes the subject matter of Example 27, and optionally, wherein the first transmission corresponds to a retransmission packet or to a new packet.

Example 30 includes the subject matter of Example 29, and optionally, wherein the first transmission is a new packet, and wherein the first transmitter is a transmitter that has sent packets to the receiver, or a new transmitter that has just passed a scheduling request and grant procedure with the receiver.

Example 31 includes the subject matter of any one of Examples 27-30, and optionally, wherein the receiver is one of a cellular base station or a cellular User Equipment (UE) adapted to operate in a device to device (D2D) setting, and wherein the first transmitter and the second transmitter include, respectively, a first UE and a second UE.

Example 32 includes the subject matter of Example 27, and optionally, further includes a front end module coupled to the RF interface.

Example 33 includes the subject matter of Example 32, and optionally, further including one or more antennas coupled to the front end module.

Example 34 includes a method to be performed at a device of a wireless first transmitter, the device including a Radio Frequency (RF) interface, and processing circuitry coupled to the RF interface, the method including: decoding information from a wireless receiver, the information regarding a signal to be sent to the receiver, the signal including a first transmission from the first transmitter and a second transmission from a second transmitter in a same time frequency resource as the first transmission, the information including scheduling information regarding the time frequency resource, and information regarding a lowest necessary transmission power for the first transmission and for the second transmission, the lowest necessary transmission power to achieve target error rates, the information further being based on a residual rate to identify a decoding estimate for the first transmission at the receiver; and encoding the first transmission for transmission to the receiver within the signal based on the information.

Example 35 includes the subject matter of Example 34, and optionally, further including decoding a request from the receiver to share the time frequency resource with the second transmitter.

Example 36 includes the subject matter of Example 34, and optionally, wherein the first transmission corresponds to a retransmission packet or to a new packet.

Example 37 includes the subject matter of Example 36, and optionally, wherein the first transmission is a new packet, and wherein the first transmitter is a transmitter that has sent packets to the receiver, or a new transmitter that has just passed a scheduling request and grant procedure with the receiver.

Example 38 includes the subject matter of any one of Examples 34-37, and optionally, wherein the receiver is one of a cellular base station or a cellular User Equipment (UE) adapted to operate in a device to device (D2D) setting, and wherein the first transmitter and the second transmitter include, respectively, a first UE and a second UE.

Example 39 includes a machine-readable medium including code which, when executed, is to cause a machine to perform the method of any one of Examples 15-26 and 34-38.

Example 40 includes a product comprising one or more tangible computer-readable non-transitory storage media comprising computer-executable instructions operable to, when executed by at least one computer processor, enable the at least one computer processor to perform the method of any one of Examples 15-26 and 34-38.

Example 41 includes an apparatus comprising means for causing a wireless communication device to perform the method of any one of Examples 15-26 and 34-38.

Example 42 includes a signal as described in or related to any of the examples above, or portions or parts thereof.

Example 43 includes a signal in a wireless network as shown and described herein.

Example 44 includes a method of communicating in a wireless network as shown and described herein.

Example 45 includes a system for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. A device of a wireless receiver, the device including a Radio Frequency (RF) interface, and processing circuitry coupled to the RF interface, the processing circuitry to:
    determine a residual rate to identify a decoding estimate for a first packet sent from a wireless first transmitter;
    determine a grouping of transmitters including the first transmitter and a wireless second transmitter scheduled to transmit a second packet to the receiver;
    perform power optimization by determining lowest necessary transmission powers to achieve target error rates, the lowest necessary transmission powers corresponding, respectively, to a transmission of the first packet from the first transmitter and to a transmission of the second packet from the second transmitter, wherein the transmission of the first packet and the transmission of the second packet are within a same time-frequency resource and together define a signal to be received at the receiver; and
    encode for transmission to the first transmitter and to the second transmitter information regarding the signal to cause the first transmitter and the second transmitter to transmit the signal based on the residual rate, the grouping and the power optimization.

2. The device of claim 1, wherein power optimization includes at least one of local optimization performed each time the information regarding the signal is to be encoded for transmission, or global optimization based on global target error rates computed by the receiver.

3. The device of claim 1, the processing circuitry further to, prior to grouping, identify one or more new packets to be transmitted thereto and one or more retransmission packets to be transmitted thereto, wherein:
    the first transmitter includes one or more first transmitters;
    the first packet includes the one or more retransmission packets from respective ones of the one or more first transmitters;
    the second transmitter includes one or more second transmitters;
    the second packet includes the one or more new packets from respective ones of the one or more second transmitters; and
    the signal includes one or more signals, each of the one or more signals including one of the one or more retransmission packets and one of the one or more new packets in a same time frequency resource.

4. The device of claim 3, the processing circuitry further to schedule the one or more signals on mutually orthogonal time frequency resources, and to determine availability of the mutually orthogonal time frequency resources prior to scheduling.

5. The device of claim 3, wherein the one or more retransmission packets include K retransmission packets, the processing circuitry further to sort a scheduling of the K retransmission packets based on a descending order of respective residual signal to noise ratios (SNRs) for the K retransmission packets.

6. The device of claim 3, wherein the one or more first transmitters include a plurality of first transmitters, the one or more second transmitters include a plurality of second transmitters, and the one or more signals include a plurality of signals, the processing circuitry to:
    select a number K of the plurality of second transmitters (K second transmitters) to share respective time frequency resources with respective ones of the plurality of first transmitters, each of the respective time frequency resources allocated to a respective one of the plurality of signals; and
    encode for transmission to the K second transmitters a request to share the respective time frequency resources.

7. The device of claim 6, wherein the processing circuitry is to select the K second transmitters based on: random selection, distance or fading conditions which allow to determine which of the second transmitters would require the least additional power, a fairness-based selection mechanism, or which of the second transmitters have used a least amount of power.

8. The device of claim 1, wherein the second packet corresponds to a retransmission packet or to a new packet.

9. The device of claim 8, wherein the second packet is a new packet, and wherein the second transmitter is a transmitter that has sent packets to the receiver, or a new transmitter that has just passed a scheduling request and grant procedure with the receiver.

10. The device of claim 1, wherein the receiver is one of a cellular base station or a cellular User Equipment (UE) adapted to operate in a device to device (D2D) setting, and wherein the first transmitter and the second transmitter include, respectively, a first UE and a second UE.

11. The device of claim 1, further includes a front end module coupled to the RF interface.

12. The device of claim 11, further including one or more antennas coupled to the front end module.

13. A method to be implemented at a device of a wireless receiver, the device including a Radio Frequency (RF) interface, and processing circuitry coupled to the RF interface, the method including:
 determining a residual rate to identify a decoding estimate for a first packet sent from a wireless first transmitter;
 determining a grouping of transmitters including the first transmitter and a wireless second transmitter, the second transmitter scheduled to transmit a second packet to the receiver;
 performing power optimization by determining lowest necessary transmission powers to achieve target error rates, the lowest necessary transmission powers corresponding, respectively, to a transmission of the first packet from the first transmitter and to a transmission of the second packet from the second transmitter, wherein the transmission of the first packet and the transmission of the second packet are within a same time-frequency resource and together define a signal to be received at the receiver; and
 encoding for transmission to the first transmitter and to the second transmitter information regarding the signal to cause the first transmitter and the second transmitter to transmit the signal based on the residual rate, the grouping and the power optimization.

14. The method of claim 13, wherein power optimization includes at least one of local optimization performed each time the information regarding the signal is to be encoded for transmission, or global optimization based on global target error rates computed by the receiver.

15. The method of claim 13, the method further including, prior to grouping, identifying one or more new packets to be transmitted thereto and one or more retransmission packets to be transmitted thereto, wherein:
 the first transmitter includes one or more first transmitters;
 the first packet includes the one or more retransmission packets from respective ones of the one or more first transmitters;
 the second transmitter includes one or more second transmitters;
 the second packet includes the one or more new packets from respective ones of the one or more second transmitters; and
 the signal includes one or more signals, each of the one or more signals including one of the one or more retransmission packets and one of the one or more new packets in a same time frequency resource.

16. The method of claim 15, the method further including scheduling the one or more signals on mutually orthogonal time frequency resources.

17. The method of claim 16, the method further including determining availability of the mutually orthogonal time frequency resources prior to scheduling.

18. The method of claim 15, wherein the one or more retransmission packets include K retransmission packets, the method further including sorting a scheduling of the K retransmission packets based on a descending order of respective residual signal to noise ratios (SNRs) for the K retransmission packets.

19. The method of claim 15, wherein the one or more first transmitters include a plurality of first transmitters, the one or more second transmitters include a plurality of second transmitters, and the one or more signals include a plurality of signals, the method further including:
 selecting a number K of the plurality of second transmitters (K second transmitters) to share respective time frequency resources with respective ones of the plurality of first transmitters, each of the respective time frequency resources allocated to a respective one of the plurality of signals; and
 encoding for transmission to the K second transmitters a request to share the respective time frequency resources.

20. The method of claim 19, the method including performing power optimization for the plurality of signals from the K second transmitters.

21. The method of claim 15, wherein the receiver is one of a cellular base station or a cellular User Equipment (UE) adapted to operate in a device to device (D2D) setting, and wherein the first transmitter and the second transmitter include, respectively, a first UE and a second UE.

* * * * *